US012587658B2

(12) United States Patent
Wang

(10) Patent No.: US 12,587,658 B2
(45) Date of Patent: Mar. 24, 2026

(54) MULTIMEDIA DATA PROCESSING METHOD, APPARATUS, DEVICE, COMPUTER-READABLE STORAGE MEDIUM, AND COMPUTER PROGRAM PRODUCT

(71) Applicant: Tencent Technology (Shenzhen) Company Limited, Shenzhen (CN)

(72) Inventor: Yingbin Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 203 days.

(21) Appl. No.: 18/474,712

(22) Filed: Sep. 26, 2023

(65) Prior Publication Data

US 2024/0015310 A1 Jan. 11, 2024

Related U.S. Application Data

(63) Continuation of application No. PCT/CN2022/118502, filed on Sep. 13, 2022.

(30) Foreign Application Priority Data

Oct. 20, 2021 (CN) .......................... 202111221890.5

(51) Int. Cl.
  *H04N 19/176* (2014.01)
  *H04N 19/159* (2014.01)
  *H04N 19/46* (2014.01)
(52) U.S. Cl.
  CPC ......... *H04N 19/176* (2014.11); *H04N 19/159* (2014.11); *H04N 19/46* (2014.11)
(58) Field of Classification Search
  None
  See application file for complete search history.

(56) References Cited

U.S. PATENT DOCUMENTS 10,212,445 B2 2/2019 Rapaka et al.
10,798,376 B2 10/2020 Xu et al.
(Continued)

FOREIGN PATENT DOCUMENTS

CN 110798683 A 2/2020
CN 110944178 A 3/2020
(Continued)

OTHER PUBLICATIONS

International Search Report and Written Opinion in International Patent Application No. PCT/CN2022/118502 dated Dec. 14, 2022, 12 pages.
(Continued)

*Primary Examiner* — Chikaodili E Anyikire
(74) *Attorney, Agent, or Firm* — Crowell & Moring LLP

(57) ABSTRACT

Embodiments of this disclosure disclose a multimedia data processing method, apparatus, device, computer-readable storage medium, and computer program product. The method includes: acquiring attribute information of a to-be-decoded data block in a multimedia data frame; acquiring a first target reference data block matching the attribute information of the to-be-decoded data block from one of: a first reference data block set, a second reference data block set, or a third reference data block set integrating the first reference data block set and the second reference data block set, the first reference data block set comprising decoded data blocks not having a neighbor relationship with the to-be-decoded data block, and the second reference data block set comprising decoded data blocks having a neighbor relationship with the to-be-decoded data block; and decoding the to-be-decoded data block according to the first target reference data block.

19 Claims, 5 Drawing Sheets

(56) References Cited

U.S. PATENT DOCUMENTS

| | | | |
|---|---|---|---|
| 10,812,817 | B2 | 10/2020 | Li et al. |
| 10,869,031 | B2 | 12/2020 | Liu et al. |
| 2016/0360210 | A1* | 12/2016 | Xiu ...................... H04N 19/105 |
| 2019/0208217 | A1 | 7/2019 | Zhou et al. |
| 2020/0228814 | A1 | 7/2020 | Xu et al. |
| 2021/0152833 | A1* | 5/2021 | Gao ..................... H04N 19/139 |
| 2021/0266557 | A1 | 8/2021 | Choi et al. |
| 2021/0314560 | A1 | 10/2021 | Lai et al. |
| 2023/0102958 | A1* | 3/2023 | Ruiz ................... H04N 19/105 |
| | | | 375/240.02 |
| 2024/0223784 | A1* | 7/2024 | Ruiz Coll ........... H04N 19/176 |

FOREIGN PATENT DOCUMENTS

| | | |
|---|---|---|
| CN | 110944190 A | 3/2020 |
| CN | 111050177 A | 4/2020 |
| CN | 112369027 A | 2/2021 |
| CN | 113992635 A | 1/2022 |
| JP | 2018-520581 A | 7/2018 |
| JP | 2018-524872 A | 8/2018 |
| WO | WO 2019/076344 A1 | 4/2019 |

OTHER PUBLICATIONS

Office Action with English Translation of Concise Explanation of Relevance for Chinese Patent Application No. 202111221890.5 dated Jun. 16, 2023, 10 pages.

Office Action issued in Japanese Patent Application No. 2023-560291 dated Oct. 7, 2024, with English translation.

Office Action issued in Japanese Patent Application No. 2023-560291 dated Mar. 31, 2025, w/English translation, 5 pages.

Extended European Search Report issued in European Patent Application No. 22882502.2 dated May 16, 2025, 19 pages.

Kwon et al., "Overview of H.264/MPEG-4 part 10" Elsevier, Aug. 26, 2005, 31 pages.

* cited by examiner

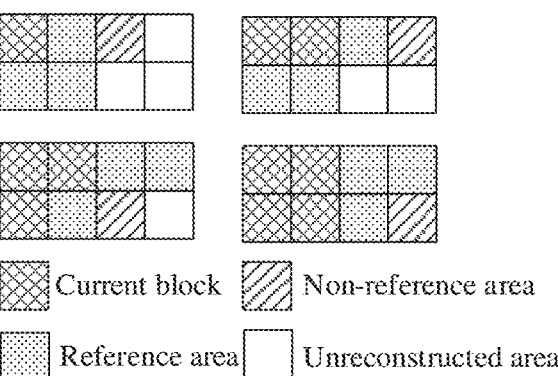

Current block    Non-reference area

Reference area    Unreconstructed area

FIG. 6

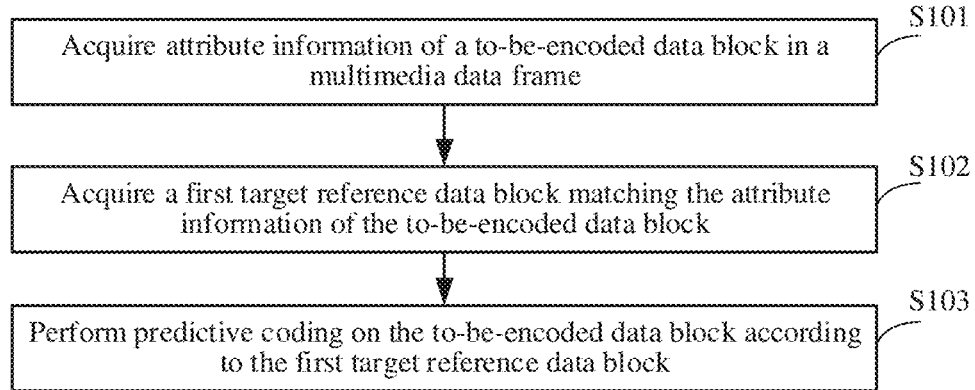

S101 — Acquire attribute information of a to-be-encoded data block in a multimedia data frame S102 — Acquire a first target reference data block matching the attribute information of the to-be-encoded data block S103 — Perform predictive coding on the to-be-encoded data block according to the first target reference data block

FIG. 7

Global reference data block set      Local reference data block set

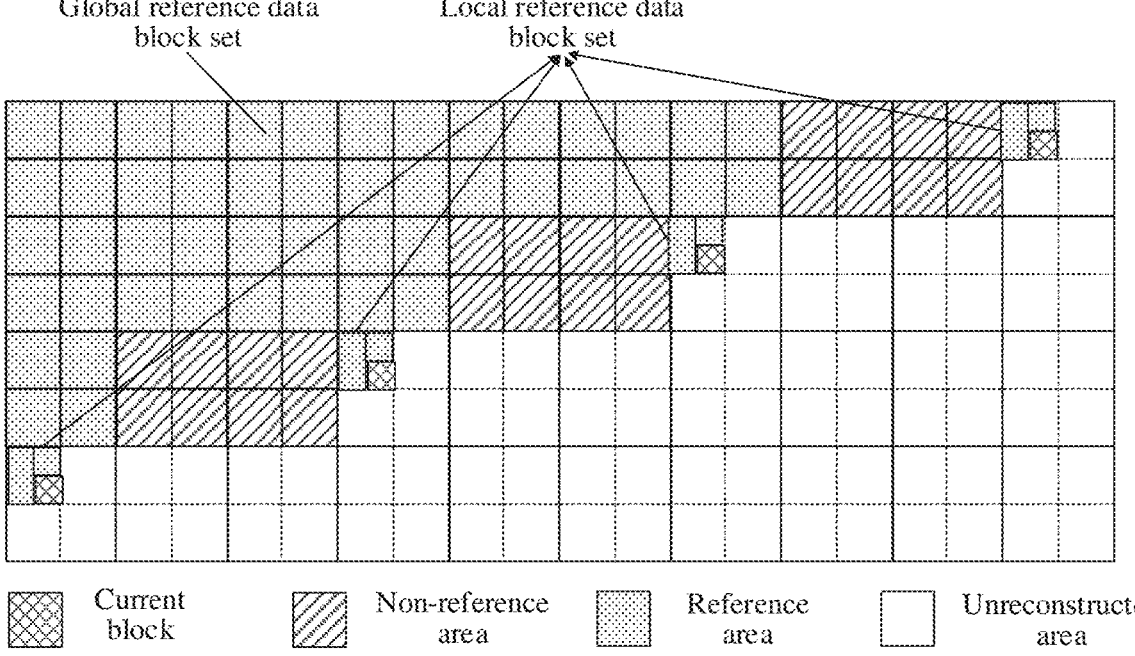

Current block    Non-reference area    Reference area    Unreconstructed area

FIG. 8

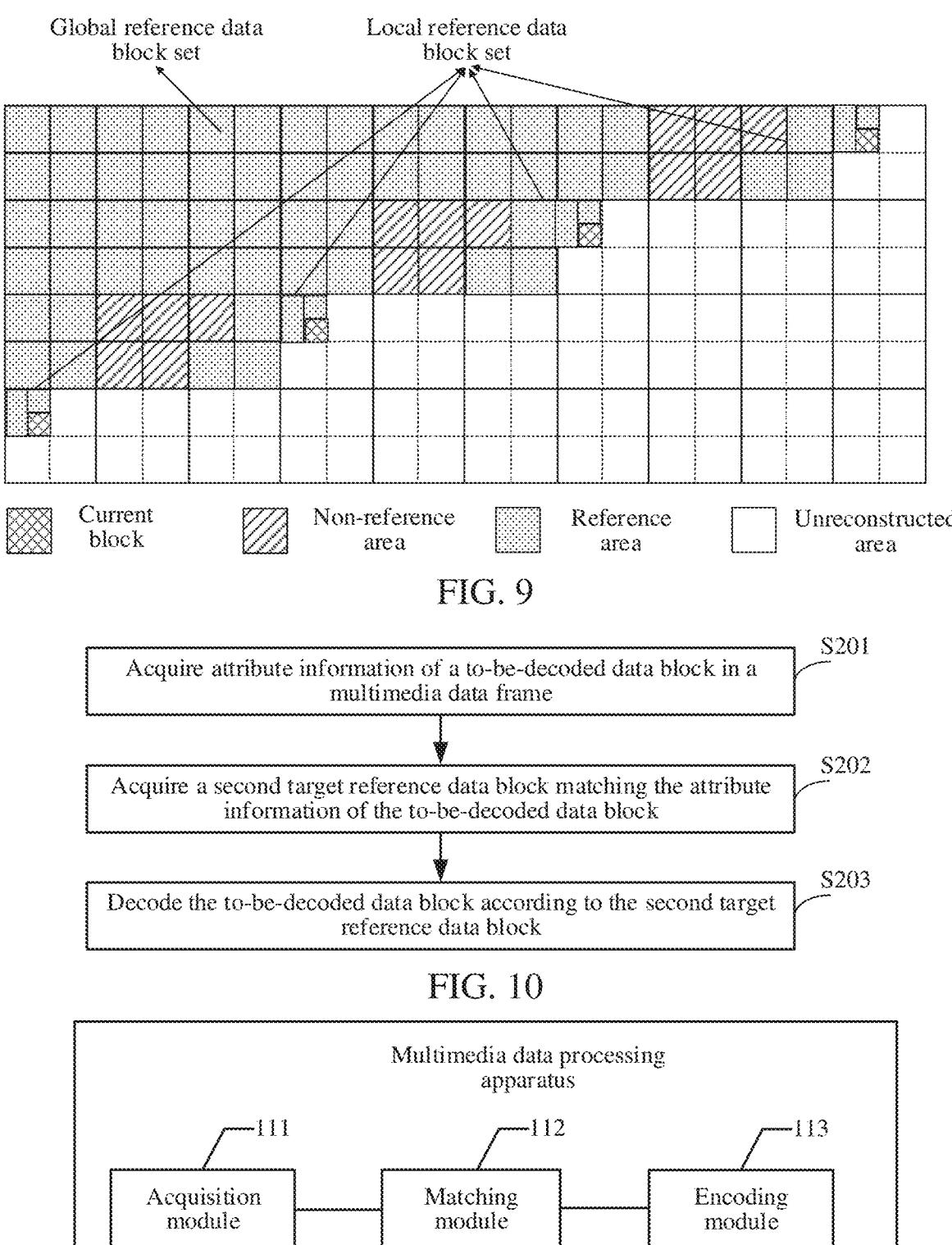

Global reference data block set

Local reference data block set

⊠ Current block     ▧ Non-reference area     ▨ Reference area     ☐ Unreconstructed area

FIG. 9

Acquire attribute information of a to-be-decoded data block in a multimedia data frame ⌐S201

Acquire a second target reference data block matching the attribute information of the to-be-decoded data block ⌐S202

Decode the to-be-decoded data block according to the second target reference data block ⌐S203

FIG. 10

Multimedia data processing apparatus

⌐111
Acquisition module

⌐112
Matching module

⌐113
Encoding module

FIG. 11

MULTIMEDIA DATA PROCESSING METHOD, APPARATUS, DEVICE, COMPUTER-READABLE STORAGE MEDIUM, AND COMPUTER PROGRAM PRODUCT

RELATED APPLICATION

This application is a continuation application of the International PCT Application No. PCT/CN2022/118502, filed with the China National Intellectual Property Administration, PRC on Sep. 13, 2022, which is based upon and claims priority to Chinese Patent Application No. 202111221890.5, filed with the China National Intellectual Property Administration, PRC on Oct. 20, 2021, each of which is incorporated herein by reference in its entirety.

FIELD OF THE TECHNOLOGY

This application relates to the field of communication technologies, and in particular, to a multimedia data processing method, apparatus, device, computer-readable storage medium, and computer program product.

BACKGROUND OF THE DISCLOSURE

During multimedia data processing, intra predictive coding is generally used for predictive coding of multimedia data frames, which can improve the coding performance of multimedia data frames. Therefore, the intra predictive coding has been widely used in the multimedia data processing. However, in practice, it is found that in current intra predictive coding methods, the coding performance of multimedia data frames is poor due to the limited number of reference data blocks used for predictive coding.

SUMMARY

Embodiments of this disclosure provide a multimedia data processing method, apparatus, device, computer-readable storage medium, and computer program product, which can improve the coding performance of multimedia data frames.

An embodiment of this disclosure provides a multimedia data processing method, including: acquiring attribute information of a to-be-encoded data block in a multimedia data frame; acquiring a first target reference data block matching the attribute information of the to-be-encoded data block, the first target reference data block being selected from a first reference data block set, a second reference data block set, or a third reference data block set integrating the first reference data block set and the second reference data block set, the first reference data block set including encoded data blocks not having a neighbor relationship with the to-be-encoded data block, and the second reference data block set including encoded data blocks having a neighbor relationship with the to-be-encoded data block; and performing predictive coding on the to-be-encoded data block according to the first target reference data block.

An embodiment of this disclosure provides a multimedia data processing method, including: acquiring attribute information of a to-be-decoded data block in a multimedia data frame; acquiring a second target reference data block matching the attribute information of the to-be-decoded data block, the second target reference data block being selected from a first reference data block set, a second reference data block set, or a third reference data block set integrating the first reference data block set and the second reference data block set, the first reference data block set including decoded data blocks not having a neighbor relationship with the to-be-decoded data block, and the second reference data block set including decoded data blocks having a neighbor relationship with the to-be-decoded data block; and decoding the to-be-decoded data block according to the second target reference data block.

An embodiment of this disclosure provides a multimedia service data processing apparatus, including: a first acquisition module, configured to acquire attribute information of a to-be-encoded data block in a multimedia data frame; a first matching module, configured to acquire a first target reference data block matching the attribute information of the to-be-encoded data block, the first target reference data block being selected from a first reference data block set, a second reference data block set, or a third reference data block set integrating the first reference data block set and the second reference data block set, the first reference data block set including encoded data blocks not having a neighbor relationship with the to-be-encoded data block, and the second reference data block set including encoded data blocks having a neighbor relationship with the to-be-encoded data block; and an encoding module, configured to perform predictive coding on the to-be-encoded data block according to the first target reference data block.

An embodiment of this disclosure provides a multimedia service data processing apparatus, including: a second acquisition module, configured to acquire attribute information of a to-be-decoded data block in a multimedia data frame; a second matching module, configured to acquire a second target reference data block matching the attribute information of the to-be-decoded data block, the second target reference data block being selected from a first reference data block set, a second reference data block set, or a third reference data block set integrating the first reference data block set and the second reference data block set, the first reference data block set including decoded data blocks not having a neighbor relationship with the to-be-decoded data block, and the second reference data block set including decoded data blocks having a neighbor relationship with the to-be-decoded data block; and a decoding module, configured to decode the to-be-decoded data block according to the second target reference data block.

An embodiment of this disclosure provides a computer device, including: a processor and a memory, the memory being configured to store program instructions, and the processor being configured to call the program instructions to execute steps in the multimedia data processing method.

An embodiment of this disclosure provides a computer-readable storage medium, storing a computer program, the computer program including program instructions, the program instructions, when executed by a processor, executing steps in the multimedia data processing method.

An embodiment of this disclosure provides a computer program product, including a computer program or computer instructions. The computer program or computer instructions, when executed by a processor, implement steps in the multimedia data processing method.

The embodiments of this disclosure have the following beneficial effects: By acquiring a first target reference data block matching the attribute information of the to-be-encoded data block, the first target reference data block being selected from a first reference data block set, a second reference data block set, or a third reference data block set integrating the first reference data block set and the second reference data block set, that is to say, reference data block sets available for selection include the first reference data block set, the second reference data block set, and the third reference data block set, the selection range of reference data blocks is expanded, and the first target reference data block can be adaptively selected according to the attribute information of the to-be-encoded data block, to realize predictive coding of the to-be-encoded data block based on the first target reference data block. Therefore, the flexibility and accuracy of acquiring the first target reference data block can be improved, and the coding performance of multimedia data frames can be improved. In addition, by performing predictive coding on the to-be-encoded data block according to the first target reference data block, redundancy in the multimedia data frame can be removed, thereby improving the transmission efficiency of multimedia data frames and saving transmission resources.

BRIEF DESCRIPTION OF THE DRAWINGS

To describe the technical solutions of the embodiments of this disclosure or the related art more clearly, the following briefly introduces the accompanying drawings required for describing the embodiments or the prior art. Apparently, the accompanying drawings in the following description show only some embodiments of this disclosure, and a person of ordinary skill in the art may still derive other drawings from these accompanying drawings without creative efforts.

FIG. 6 is a schematic diagram of a scenario of memory reuse of a reference data block of a multimedia data frame according to an embodiment of this disclosure.

FIG. 7 is a schematic flowchart of a multimedia data processing method according to an embodiment of this disclosure.

FIG. 8 is a schematic diagram of a position relationship between a first reference data block set, a second reference data block set, and a to-be-encoded data block according to an embodiment of this disclosure.

FIG. 9 is a schematic diagram of another position relationship between a first reference data block set, a second reference data block set, and a to-be-encoded data block according to an embodiment of this disclosure.

FIG. 10 is a schematic flowchart of another multimedia data processing method according to an embodiment of this disclosure.

FIG. 11 is a schematic structural diagram of a multimedia data processing apparatus according to an embodiment of this disclosure.

DESCRIPTION OF EMBODIMENTS

The technical solutions in the embodiments of this disclosure are clearly and completely described in the following with reference to the accompanying drawings in the embodiments of this disclosure. Apparently, the described embodiments are merely some rather than all of the embodiments of this disclosure. All other embodiments obtained by a person of ordinary skill in the art based on the embodiments of this disclosure without creative efforts shall fall within the protection scope of this application.

Figure 1:
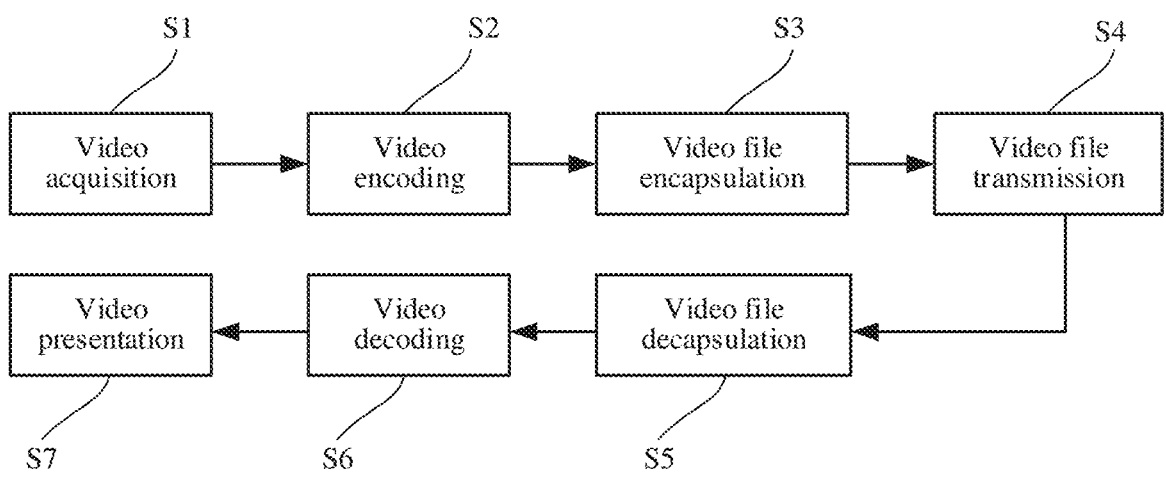
FIG. 1 is a flowchart of video processing according to an embodiment of this disclosure.

The embodiments of this disclosure relate to a multimedia data processing technology. Multimedia data (or media data) refers to composite data formed by media data which are associated with each other in content, such as text, graphics, images, sounds, animations, moving images, etc. The multimedia data mentioned in the embodiments of this disclosure mainly includes image data composed of images or video data composed of images, sounds, etc. In the embodiments of this disclosure, a data processing procedure of multimedia data is described in detail mainly using an example where the multimedia data is video data. For cases where the multimedia data is image data, reference can be made to the embodiments of this disclosure. A multimedia data processing procedure involved in the embodiments of this disclosure mainly includes media data acquisition, media data encoding, media data file encapsulation, media data file transmission, media data decoding, and final data presentation. When the multimedia data is video data, a complete processing procedure for the video data may be shown in FIG. 1, and may include: S1, video acquisition; S2, video encoding; S3, video file encapsulation; S4, video file transmission; S5, video file decapsulation; S6, video decoding; and S7, video presentation.

Figure 2:
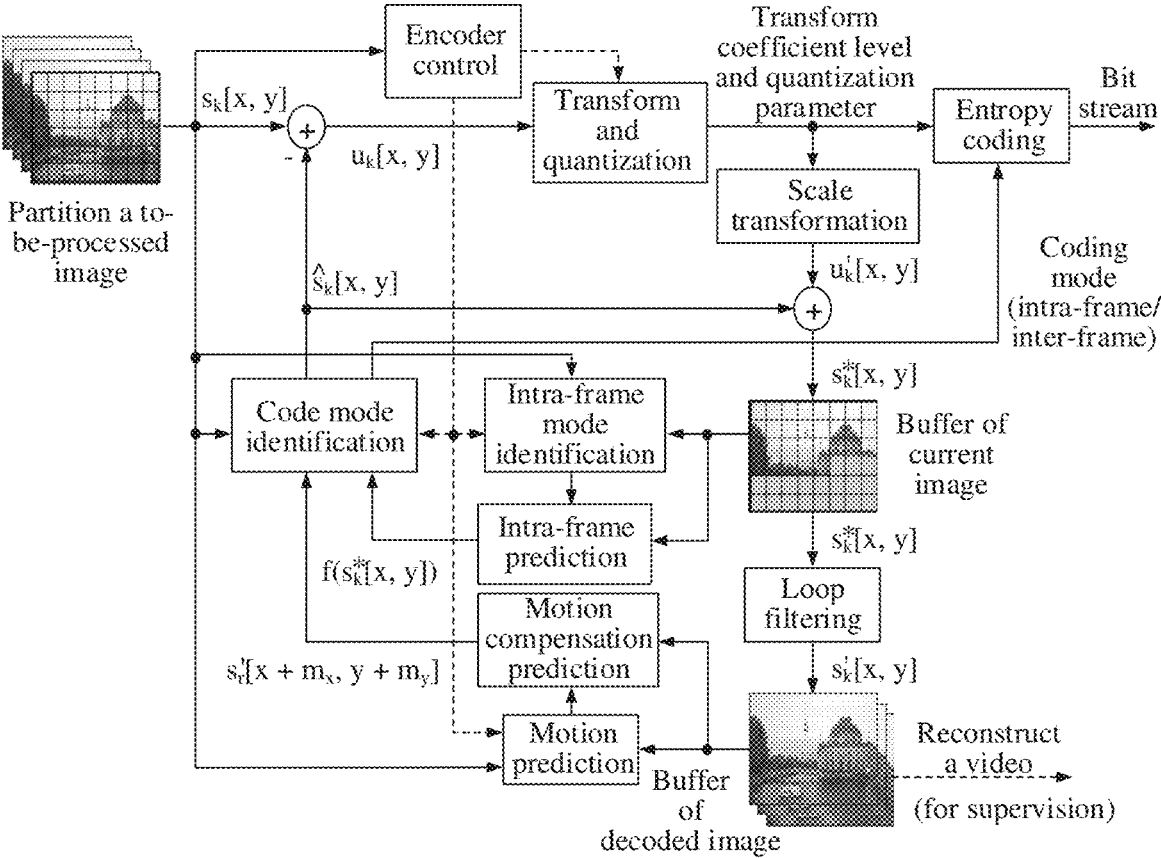
FIG. 2 is a schematic flowchart of a multimedia data processing method according to an embodiment of this disclosure.

Video acquisition is to convert an analog video into a digital video, and save the digital video in the format of a digital video file. To be specific, video acquisition can convert a video signal into binary digital information. The binary information converted from the video signal is a binary data stream, which can also be called bit stream or bitstream of the video signal. Video encoding is to convert a file in an original video format into a file in another video format through a compression technology. Generation of a video media content mentioned in the embodiments of this disclosure includes capturing a real scene by a camera and generating a screen content scene by a computer. Based on video signal acquisition manners, video signals may be divided into two types of signals: those captured by a camera and those generated by a computer. Due to different statistical characteristics, compression coding manners corresponding to different video signals may also be different. At present, mainstream video coding technologies adopt a hybrid coding framework to perform the following series of operations and processes on an input original video signal, as shown in FIG. 2.

Figure 3:
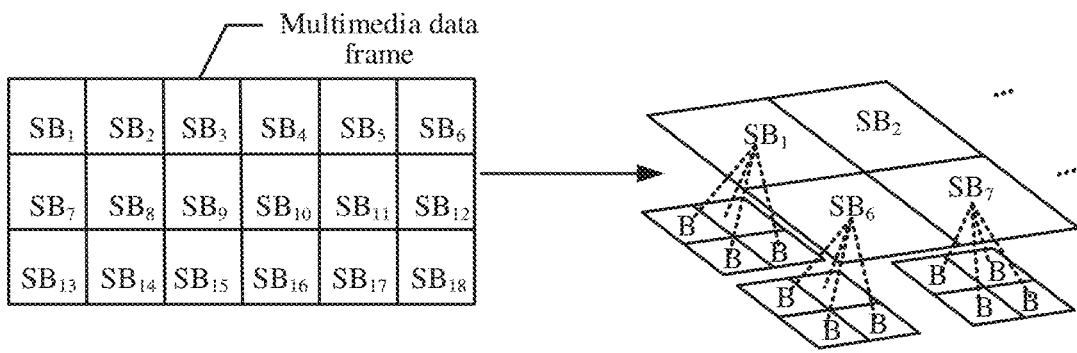
FIG. 3 is a schematic diagram of a to-be-encoded data block according to an embodiment of this disclosure.

Block partition structure: A multimedia data frame (e.g., a video frame in video data) is input. The video frame is divided into a plurality of non-overlapping processing units according to the size of the video frame, and a similar compression operation is performed on each processing unit. In one embodiment, this processing unit is referred to as a coding tree unit (CTU), or a largest coding unit (LCU). The CTU may be divided more finely, to obtain one or more basic units of coding, which are called coding units (CUs). Each CU is the most basic element in the coding step. In another embodiment, the processing unit, also referred to as a tile, is a rectangular area of the multimedia data frame that can be independently decoded and encoded. The tile may be further divided more finely to obtain one or more superblocks (SBs). Each superblock may be further divided to obtain one or more data blocks (Bs). Each data block is the most basic element in the coding step. Described below are various encoding manners that may be adopted for each data block, where the relationship between SBs and Bs is shown in FIG. 3. In some implementations, a superblock may also be referred to as a largest coding block. In some implementations, each superblock may have an equal size.

Predictive coding: It includes intra-frame prediction, inter-frame prediction, etc. After an original video signal is predicted by a selected encoded video signal, a residual video signal is obtained. An encoder side needs to select the most suitable one among numerous possible predictive coding modes for a current encoded data block (i.e., to-be-decoded data block) and inform a decoder side of the selected predictive coding mode. Intra-frame prediction (intra picture prediction) means that the predicted signal comes from an encoded and reconstructed area in the same image. Inter-frame prediction (inter picture prediction) means that the predicted signal comes from another image (called reference image) that have been encoded and that is different from the current image.

Transform and quantization: The residual video signal is transformed into the transform domain by a transformation operation such as discrete Fourier transform (DFT) or discrete cosine transform. A lossy quantization operation is performed on the signal in the transform domain so that the quantized signal is favorable for compressed expression.

In some video coding standards, there may be more than one transformation mode to choose, therefore, the encoder side also needs to select one of the transformation modes for the current encoded data block and inform the decoder side of the selected transformation mode. The precision of quantization is generally determined by a quantization parameter (QP). When a value of the QP is greater than a QP threshold, it indicates that a coefficient larger than a preset value range will be quantized into the same output, which generally leads to distortion greater than a distortion rate threshold and a bit rate less than a bit rate threshold. On the contrary, when the value of the QP is less than or equal to the QP threshold, it indicates that a coefficient less than the preset value range will be quantized into the same output, which generally leads to distortion less than the distortion rate threshold and a bit rate greater than the bit rate threshold.

Entropy coding or statistical coding: The quantized transform-domain signal is statistically compression-coded according to the frequency of occurrence of each value, and finally a binary (0 or 1) compressed bit stream is output. In addition, other information generated by coding, such as a selected mode, motion vector, etc., also need to be entropy coded to reduce the bit rate.

Statistical coding is a lossless coding method, which can effectively reduce the bit rate needed to express the same signal. Commonly used statistical coding methods include variable length coding (VLC) or content adaptive binary arithmetic coding (CABAC).

Loop filtering: A reconstructed decoded image may be obtained from the encoded image (i.e., multimedia data frame) through inverse quantization, inverse transformation and predictive compensation. Compared with the original image, some information of the reconstructed image is different from that of the original image due to the influence of quantization, resulting in distortion. A filtering operation such as deblocking (deblocking), sample adaptive offset (SAO) or adaptive loop filter (ALF), is performed on the reconstructed image. This can effectively reduce the degree of distortion caused by quantization. Since such filtered reconstructed images will be used as references for subsequent to-be-encoded images to predict future signals, the above filtering operation is also referred to as loop filtering and a filtering operation within the encoding loop.

A basic process of a video encoder is shown in FIG. 2. In FIG. 2, the $k^{th}$ CU (expressed as $S_k[x, y]$) is taken as an example for description, where k is a positive integer greater than or equal to 1 and less than or equal to the number of CUs in a current image inputted, $S_k[x, y]$ represents a pixel with coordinates [x, y] in the $k^{th}$ CU, x represents an abscissa of the pixel, and y represents an ordinate of the pixel. After $S_k[x, y]$ is subjected to a better processing among motion compensation, intra prediction or the like, a predicted signal $\widehat{S_k}[x, y]$ is obtained. $\widehat{S_k}[x, y]$ is subtracted from $S_k[x, y]$ to obtain a residual signal $U_k[x, y]$, and then the residual signal $U_k[x, y]$ is transformed and quantized. Data outputted by quantization output data are for two different purposes. For one purpose, the data is transmitted to an entropy encoder for entropy coding, and a bit stream obtained by the coding is output to and saved in a buffer, waiting to be sent out. For another purpose, the data is inversely quantized and inversely transformed to obtain a signal $U'_k[x, y]$. The signal $U'_k[x, y]$ and $\widehat{S_k}[x, y]$ are added to obtain a new predicted signal $S^*_k[x, y]$, and $S^*_k[x, y]$ is transmitted to and saved in a buffer of the current image. After $S^*_k[x, y]$ is subjected to intra-image prediction, $f(S^*_k[x, y])$ is obtained. After $S^*_k[x, y]$ is subjected to loop filtering, $S'_k[x, y]$ is obtained, and $S'_k[x, y]$ is transmitted to and saved in a buffer of a decoded image for generating a reconstructed video. After $S'_k[x, y]$ is subjected to motion compensation prediction, $S'_r[x+m_x, y+m_y]$ is obtained. $S'_r[x+m_x, y+m_y]$ represents a reference block, and $m_x$ and $m_y$ represent horizontal and vertical components of a motion vector, respectively.

According to the above encoding process, it can be seen that at the decoding end, after the decoder obtains a compressed bit stream for each data block, the decoder first performs entropy decoding to obtain various mode information and quantized transform coefficients. Each coefficient is inversely quantized and inversely transformed to obtain a residual signal. In addition, according to known coding mode information, a predicted signal corresponding to the data block can be obtained. An encoded data block can be obtained after the two signals are added. Finally, the encoded data block needs to be subjected to a loop filtering operation to generate a final encoded data block.

At present, the mainstream video coding standards, such as HEVC, VVC, AVS3, AV1 and AV2, all adopt a block-based hybrid coding framework. These video coding standards divide an original multimedia data frame into a series of encoded data blocks, and implement video data compression based on a video coding method such as prediction, transformation and entropy coding. Motion compensation is a type of predictive coding method commonly used in video coding. Motion compensation is to derive a predicted value of a current encoded data block from an encoded area (i.e., reference data block) based on the redundancy characteristics of video content in time domain or spatial domain. This type of predictive coding method includes: inter-frame prediction, intra block copy prediction, intra string copy prediction, etc. These predictive coding methods may be used individually or in combination in predictive coding implementations. For encoded data blocks using these predictive coding methods, one or more two-dimensional displacement vectors generally need to be explicitly or implicitly encoded in the bit stream, to indicate a displacement of the current encoded data block (or a co-located block of the current block) relative to one or more reference data blocks of the encoded data block.

It should be noted that, the name of the displacement vector may vary with different predictive coding modes, and embodiments of this disclosure are generally described in the following manner: 1) The displacement vector in inter-frame prediction is called Motion Vector (MV). 2) The displacement vector in intra block copy (i.e. intra predictive coding) is called Block Vector (BV). 3) The displacement vector in intra string copy is called String Vector (SV). Related technologies in inter-frame prediction and intra block copy prediction are introduced below.

Figure 4:
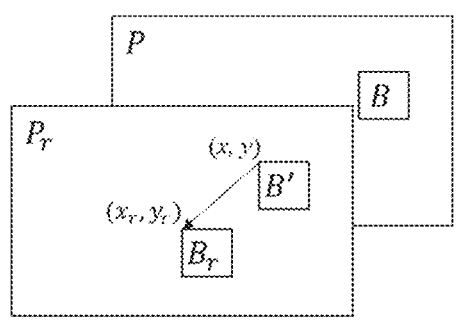
FIG. 4 is a schematic diagram of a scenario of non-intra coding of a multimedia data frame according to an embodiment of this disclosure.

1.1. Inter-frame prediction. As shown in FIG. 4, the inter-frame prediction uses the temporal correlation of the multimedia data frames to predict pixels of the current image by using pixels of the adjacent encoded image, so as to effectively remove the temporal redundancy of the multimedia data frames and effectively save bits for encoding residual data. P is a current frame, Pr is a reference frame, B is a current to-be-decoded data block, and Br is a reference data block of B. B' and B have the same coordinate position in the image, coordinates of Br are $(x_r, y_r)$, and coordinates of B' are (x, y). A displacement between the current encoded data block and its reference data block, called motion vector (MV), can be expressed by the following formula (1):

$$MV = (x_r - x, y_r - y) \tag{1}$$

Considering the strong correlation between adjacent blocks in time domain or spatial domain, MV prediction technology can be used to further reduce the bits needed for encoding the MV.

Figure 5:
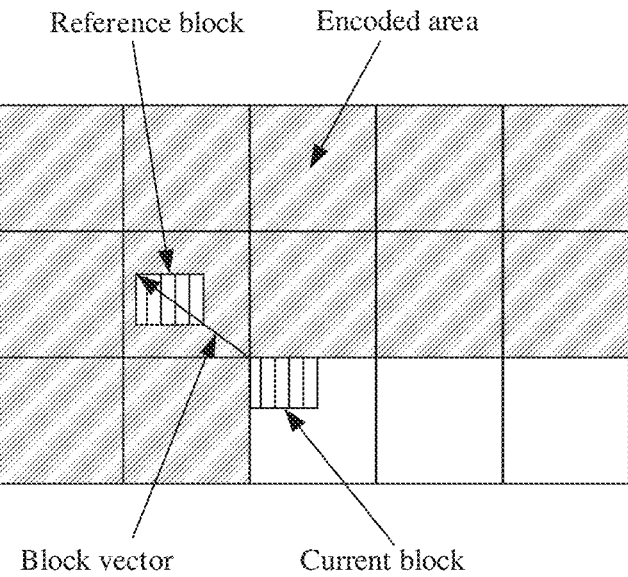
FIG. 5 is a schematic diagram of a scenario of intra block copy of a multimedia data frame according to an embodiment of this disclosure.

2.1. Intra block copy prediction. Intra Block Copy (IBC) is an intra encoding tool adopted in the extension of HEVC Screen Content Coding (SCC). Intra Block Copy significantly improves the encoding efficiency of screen contents. In AVS3, VVC and AV1, IBC technology is also adopted to improve the performance of screen content coding. IBC uses the spatial correlation of a screen content video to predict pixels of to-be-decoded data blocks by using pixels of encoded data blocks in a multimedia data frame, to effectively save bits required for encoding pixels. FIG. 5 is a schematic diagram of IBC technology, in which a displacement between a to-be-decoded data block and its reference data block is called block vector (BV).

In the extension of HEVC SCC, IBC mode adopts an implementation method similar to inter-frame prediction. If the multimedia data frame allows the use of the IBC mode, a current image having been encoded and having not been filtered is taken as a special reference frame from which a predicted value of the to-be-decoded data block is derived in a motion compensated manner with the inter-frame prediction. This implementation method has the following characteristics: 1) BV only adopts integer precision; 2) A global reference data block set (i.e. a global reference range) is employed, i.e. all encoded portions of the current multimedia data frame can be used as reference data blocks of the to-be-decoded data block except for certain areas which are prohibited from being used as reference data blocks based on considerations of parallel processing and chrominance interpolation. 3) In the buffer of the decoded image, the current image having been encoded and having not been filtered occupies buffer space having a size of one image. 4) The current image having been encoded and having not been filtered is at the end of a reference image list.

In a hardware implementation, a computing core can read data from and write data to an on-chip memory or off-chip memory. The on-chip memory is generally a static memory with high reading and writing speed. However, due to the relatively high price of the on-chip memory, generally only a small on-chip memory is used. The off-chip memory is generally much larger. To achieve efficient access, some rules needs to be followed. There is generally a writing-back delay when writing the most recently encoded data block back to an off-chip picture memory. In a hardware implementation of motion compensation, the current encoded image is written to the off-chip memory for future reference after the loop filtering operation is completed. When motion compensation of a subsequent encoded data block requires reference to an encoded data block located in the off-chip memory, relevant data of the reference data block needs to be read from the off-chip memory. This process involves memory bandwidth consumption for writing and reading. Although the software implementation of IBC scheme in HEVC-SCC has little influence on software design in related technologies, the hardware implementation of IBC scheme has the following two problems. a. The reference image of IBC is a version having not been processed by loop filtering, which is different from the final output decoded image. Outputting the image to the off-chip memory leads to an increase in memory bandwidth. b. A neighboring data block currently having been encoded or having just been reconstructed may be used as a reference for the next encoded data block. This requires processes such as decoding the reconstructed data block, outputting to the off-chip memory, and reading into the on-chip memory to be completed in a limited clock cycle. This poses a great challenge to hardware implementation.

Aiming at the problems of IBC hardware implementation, some IBC-related optimization schemes have been adopted in subsequent standards such as VVC, AVS3 and AV1. IBC scheme in VVC and AVS3 standards uses a local reference data block set, that is, an encoded data block neighboring to a current encoded data block is used as a reference data block of the current encoded data block. In a hardware implementation, a reference data block in a local reference data block set stored in an on-chip memory can be used to solve the above problems. Considering the costs and coding performance of the hardware implementation, IBC only uses reference data blocks in the local reference data block set stored in memory having a size of one CTU, and adopts a reference memory reuse policy shown in FIG. 6. In addition to storing the current 64×64 CUs to be reconstructed, there are three 64×64 CUs available to store the reconstructed data blocks. Therefore, IBC can only search for reference data blocks in these three 64×64 CUs and the reconstructed portion of the current 64×64 CU.

To sum up, the IBC scheme in AV1 standard uses a global reference data block set, that is, the current encoded data block allows reference to encoded data blocks in the current multimedia data frame. However, this scheme has the following two defects: A, in order to meet the requirement of a write-back limitation condition, encoded data blocks neighboring to the current encoded data block are not allowed to be used as reference data blocks. B If the current multimedia data frame allows the use of IBC, the loop filter will be disabled. However, screen content sequences often have a strong spatial correlation, neighboring data blocks have high reference value, and allowing the use of adjacent encoded data blocks as reference data blocks helps improve the coding performance. For some sequence contents, disabling the loop filter leads to serious degradation of multimedia data quality and affects the coding performance. Although the IBC scheme based on the local reference data block set does not have the above defects, using only the local reference data block set may degrade the coding performance of multimedia data frames because the number of available reference data blocks in the local reference data block set is limited. According to the characteristics of sequence contents, the encoding parameters such as global reference data block set, local reference data block set and loop filtering processing affect the coding performance to different extents. Therefore, according to the defects in the IBC scheme based on the global reference data block set and in the IBC scheme based on the local reference data block set, in the embodiments of this disclosure, selecting an appropriate predictive coding mode according to the attribute information of the multimedia data frame is beneficial to improving the coding performance. That is to say, in this application, a reference data block is adaptively selected from a first reference data block set (i.e. a global reference data block set), a second reference data block set (i.e. a local reference data block set), or a third data block set integrating the second reference data block set and the first data block set according to the attribute information of the current encoded data block. This expands the selection range of reference data blocks and solves the problem that the number of reference data blocks is limited. Predictive coding is performed on the current encoded data block according to the selected reference data block. This can improve the coding performance of the multimedia data frame.

It should be noted that, this application may be executed by a terminal, a server, or jointly by a terminal and a server. Devices for executing the method in this application may be collectively referred to as computer devices. The server may be an independent physical server, or may be a server cluster or a distributed system formed by at least two physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform. The terminal may be a smart in-vehicle terminal, a smart camera, a smartphone, a tablet computer, a notebook computer, a desktop computer, a smart speaker, a screen speaker, a smartwatch, a smart television or the like, but is not limited thereto. The terminal and the server may be directly or indirectly connected through wired or wireless communication, and the number of terminals and the number of servers may be one or at least two, which is not limited in this application.

It should be noted that, Embodiments of this disclosure can be applied to various scenarios, including but not limited to cloud technology, artificial intelligence, intelligent transportation, assisted driving, etc. For example, in a smart traffic scenario, the multimedia data frame is a video frame or an image frame obtained by shooting a road by a camera device. The camera device may be an in-vehicle terminal or a camera device on a road side. According to the embodiments of this disclosure, predictive coding of the multimedia data frame is beneficial to improving the coding performance of the multimedia data frame. The road condition can be observed in real time through the encoded multimedia data frame, thus improving the driving safety of vehicles.

FIG. 7 is a schematic flowchart of a multimedia data processing method according to an embodiment of this disclosure. As shown in FIG. 7, the method may include at least the following steps S101-S103.

S101: Acquire attribute information of a to-be-encoded data block in a multimedia data frame.

In an embodiment of this disclosure, a computer device may acquire the multimedia data frame. The multimedia data frame may be captured by the computer device, or the multimedia data frame may be downloaded from a network by the computer device. The multimedia data frame refers to a video frame to be decoded in video data or an image frame to be decoded in image data, and the video data can refer to live video data, film and television video data, daily life video data, road monitoring video data and the like; The image data may refer to person image data building image data article image data and the like. The attribute information of the to-be-encoded data block in the multimedia data frame can be obtained, the to-be-encoded data block may refer to the current encoded data block described above, and the to-be-encoded data block may refer to a to-be-encoded data block among the unencoded data blocks in the multimedia data frame, i.e., the to-be-encoded data block may refer to the unencoded data block closest to the encoded data block in the multimedia data frame.

The attribute information of the to-be-encoded data block includes one or more of the media type of the multimedia data frame to which the to-be-encoded data block belongs, the reference flag of the multimedia data frame, the definition of the multimedia data frame to which the to-be-encoded data block belongs, and the like. The media types include Intra and non-Intra, the Intra type may refer to multimedia data frames with representative meaning, and the Intra type includes full Intra encoded frames, Intra frames, I frames and key frames. Intra-type frames only allow intra-coding technology, and do not need to rely on other frames for coding. For example, the intra type may refer to a multimedia data frame capable of embodying a major meaning in video data or image data. The non-intra type may refer to multimedia data frames other than intra types in video data or image data, and may be referred to as inter-encoded frames, P frames, B frames, or non-key frames. Non-intra-frame type frames allow the use of inter-frame coding technology and intra-frame coding technology. Usually, when inter-frame coding technology is adopted, the reference frame can be encoded only after the coding is completed. The reference flag of the multimedia data frame is used for reflecting the selection range of the reference data block of the to-be-encoded data block.

S102: Acquire a first target reference data block matching the attribute information of the to-be-encoded data block, the first target reference data block being selected from a first reference data block set, a second reference data block set, or a third reference data block set integrating the first reference data block set and the second reference data block set, the first reference data block set including encoded data blocks not having a neighbor relationship with the to-be-encoded data block, and the second reference data block set including encoded data blocks having a neighbor relationship with the to-be-encoded data block. The third set of data blocks includes data blocks in the first set of data blocks and the second set of data blocks, i.e. the third set of data blocks includes encoded data blocks that do not have a neighbor relationship with the to-be-encoded data block and encoded data blocks that have a neighbor relationship with the to-be-encoded data block.

In an embodiment of this disclosure, an encoded data block in which the multimedia data frame does not have a neighbor relationship with the to-be-encoded data block, and an encoded data block in which the to-be-encoded data block has a neighbor relationship with the to-be-encoded data block can be used as a reference data bloc. A computer device can improve flexibility and accuracy in obtaining a reference data block by adaptively selecting a first target reference data block from an encoded data block having a neighbor relationship and an encoded data block not having a neighbor relationship according to attribute information of the to-be-encoded data block.

It should be noted that, the encoded data block in the embodiment of this disclosure can also be referred to as the reconstructed data block at the encoding end, and the reconstructed data block refers to the data block after the encoded data block has undergone recovery processing (for example, inverse quantization, inverse transformation and predictive compensation operations, etc.).

It should be noted that, the first target reference data block may be an encoded data block having a neighbor relationship with the to-be-encoded data block. Alternatively, the first target reference data block may refer to an encoded data block that does not have a neighbor relationship with the to-be-encoded data block. Alternatively, a first region of the first target reference data block belongs to an encoded data block having a neighbor relationship with the to-be-encoded data block, and a second region of the first target reference data block may belong to an encoded data block having no neighbor relationship with the to-be-encoded data block.

S103: Perform predictive coding on the to-be-encoded data block according to the first target reference data block.

In an embodiment of this disclosure, the computer device may, according to the position information of the first target reference data block, the to-be-encoded data block in the multimedia data frame. A block vector between the first target reference data block and the to-be-encoded data block is determined. Then, the predicted signal of the to-be-encoded data block is obtained according to the block vector and the first target reference data block prediction, and the residual signal of the to-be-encoded data block is obtained according to the actual signal and the predicted signal of the to-be-encoded data block, i.e. the residual signal of the to-be-encoded data block is the prediction coding value of the to-be-encoded data block; By performing predictive coding on the to-be-encoded data block, redundancy in the multimedia data frame can be removed, thereby improving the transmission efficiency of multimedia data frames and saving transmission resources.

It should be noted that, generally, the video data includes a plurality of multimedia data frames, or the image data includes a plurality of multimedia data frames, but the to-be-encoded data block and the first target reference data block all belong to the same multimedia data frame.

In the embodiment of this disclosure, a computer device acquires a first target reference data block matching the attribute information of the to-be-encoded data block, the first target reference data block being selected from a first reference data block set, a second reference data block set, or a third reference data block set integrating the first reference data block set and the second reference data block set, that is, the selectable reference data block set includes a first reference data block set, a second reference data block set, and a third reference data block set, extending the selection range of the reference data blocks. In addition, the first target reference data block can be adaptively selected according to the attribute information of the to-be-encoded data block, to realize predictive coding of the to-be-encoded data block based on the first target reference data block. Therefore, the flexibility and accuracy of acquiring the first target reference data block can be improved, and the coding performance of multimedia data frames can be improved. In addition, by performing predictive coding on the to-be-encoded data block according to the first target reference data block, redundancy in the multimedia data frame can be removed, thereby improving the transmission efficiency of multimedia data frames and saving transmission resources.

In some embodiments, the computer device may obtain a first target reference data block that matches the attribute information of the to-be-encoded data block by one or more combinations of the following three matching modes:

Matching manner 1: If the media type of the multimedia data frame is an intra-frame type, obtaining a first target reference data block matching the attribute information of the to-be-encoded data block from the first reference data block set or the third reference data block set; If the media type of the multimedia data frame is a non-intra type, a first target reference data block matching the attribute information of the to-be-encoded data block is obtained from the second reference data block set. That is, the computer device can adaptively select a reference data block set based on attribute information of the to-be-encoded data block, and further determine a first target reference data block from the selected reference data block set, thereby improving flexibility and accuracy in obtaining the reference data block.

Typically, the number of data blocks in the first reference data block set is greater than the number of data blocks in the second reference data block set; A first reference data block set and a second reference data block set are stored in a first storage space and a second storage space, respectively. The first storage space and the second storage space may be located in the same computer device or in different computer devices. The first storage space and the second storage space may refer to a magnetic disk, a storage medium array, or the like. When the first storage space and the second storage space are located in the same computer device, the first storage space may refer to an off-chip memory of the computer device, and the second storage space may refer to an on-chip memory of the computer device; Alternatively, the first storage space may refer to on-chip memory of the computer device and the second storage space may refer to off-chip memory of the computer device.

In the first matching mode, if the media type of the multimedia data frame is an intra type, it shows that the importance of the multimedia data frame is relatively high. A data block having the strongest correlation with the to-be-encoded data block (i.e., a search optimal data block) can be searched from the first and second reference data block sets (i.e., a third reference data block set). As a first target reference data block matching attribute information of the to-be-encoded data block, the first target reference data block is determined by the first reference data block set and the second reference data block set. That is, any data block in the first reference data block set and the second reference data block set is allowed to be used as a reference data block, which expands the selection range of the reference data block and is beneficial to improving the coding performance of multimedia data frames. If the media type of the multimedia data frame is a non-intra type, indicating that the importance of the multimedia data frame is relatively low, a data block having the strongest correlation with the to-be-encoded data block is searched from the second reference data block set as a first target reference data block matching the attribute information of the to-be-encoded data block. According to the media type of the multimedia data frame, the reference data block matching with the to-be-encoded data block is adaptively selected, which is beneficial to improve the accuracy and flexibility of obtaining the reference data block.

Here, the first target reference data block is a data block determined according to the first reference data block set and the second reference data block set, and has one of the following meanings: First, the first target reference data block is selected from the first reference data block set;

second, the first target reference data block is selected from the second reference data block set; or third, the first area of the first target reference data block belongs to the first reference data block set, and the second area of the first target reference data block may belong to the second reference data block set, i.e. the first target reference data block is partly part of the second reference data block set and partly part of the first set of data blocks. The correlation between the to-be-encoded data block and the encoded data block may be determined based on similarity between pixels in the to-be-encoded data block and pixels in the encoded data block.

In the matching mode one, if the media type of the multimedia data frame is an intra-frame type, a data block having the strongest correlation with the to-be-encoded data block can be searched from the first reference data block set as a first target reference data block matching the attribute information of the to-be-encoded data block. If the media type of the multimedia data frame is a non-intra type, a data block having the strongest correlation with the to-be-encoded data block is searched from the second reference data block set as a first target reference data block matching the attribute information of the to-be-encoded data block. According to the media type of the multimedia data frame, the reference data block matching with the to-be-encoded data block is adaptively selected, which is beneficial to improve the accuracy and flexibility of obtaining the reference data block.

It should be noted that, a computer searches for a data block having the strongest correlation with the to-be-encoded data block from the first reference data block set and the second reference data block set, as a first target reference data block matching attribute information of the to-be-encoded data block, from an area formed by data blocks in the first reference data block set and the second reference data block set, a pixel having the strongest correlation with the pixels in the to-be-encoded data block is searched, and an area where the pixel having the strongest correlation with the pixels in the to-be-encoded data block is located is taken as a first target reference data block matching attribute information of the to-be-encoded data block.

Manner 2 The attribute information of the to-be-encoded data block includes a reference flag of the multimedia data frame to which the to-be-encoded data block belongs; and the acquiring, by the computer device, a first target reference data block matching the attribute information of the to-be-encoded data block comprises: searching for a data block having a strongest correlation with the to-be-encoded data block from the first reference data block set or the third reference data block set as the first target reference data block matching the attribute information of the to-be-encoded data block, in response to the reference flag of the multimedia data frame being a first reference flag; and searching for a data block having a strongest correlation with the to-be-encoded data block from the second reference data block set as the first target reference data block matching the attribute information of the to-be-encoded data block, in response to the reference flag of the multimedia data frame being a second reference flag. The reference flag may be preset by the sender (or receiver) of the multimedia data frame. Therefore, adaptively selecting the first target reference data block according to the reference flag is equivalent to adaptively selecting the first target reference data block according to the coding requirement of the user, which is beneficial to improving the flexibility and accuracy of the selected reference data block.

The first reference flag is used for indicating that the selection range of the reference data block of the to-be-encoded data block is the first reference data block set or the third reference data block set, and the second reference flag is used for indicating that the selection range of the reference data block of the to-be-encoded data block is the second reference data block set. The first reference flag and the second reference flag may be preset by the sender (or receiver) of the multimedia data frame, and may be composed of one or more of numbers, letters and Chinese characters. For example, the first reference flag (ibc_ref_flag) is 1 and the second reference flag is 0. When the reference flag of the multimedia data frame in the multimedia data frame is 1, the computer device may obtain a first target reference data block that matches the attribute information of the to-be-encoded data block from the first reference data block set; When the reference flag of the multimedia data frame in the multimedia data frame is 0, the computer device may obtain a first target reference data block that matches the attribute information of the to-be-encoded data block from the second reference data block set.

It should be noted that, when the media type of the multimedia data frame is an intra type, a reference flag is included in the header of the multimedia data frame; When the media type of the multimedia data frame is a non-intra type, the reference flag may not be included in the header of the multimedia data frame; Alternatively, when the multimedia data frame is allowed to use the IBC encoding mode, a reference flag is included in the header of the multimedia data frame; When the multimedia data frame is not allowed to adopt the IBC encoding mode, the header of the multimedia data frame may not include a reference flag; At this time, the computer device may determine a first target reference data block that matches the attribute information of the to-be-encoded data block according to whether a reference flag is included in the header of the multimedia data frame.

In the second matching mode, if the reference flag of the multimedia data frame is the first reference flag, searching a data block having the strongest correlation with the to-be-encoded data block from the first reference data block set as a first target reference data block matching the attribute information of the to-be-encoded data block, where the first target reference data block refers to any first reference data block in the first reference data block set. If the reference flag of the multimedia data frame is the second reference flag, a data block having the strongest correlation with the to-be-encoded data block is searched from the second reference data block set as a first target reference data block matching the attribute information of the to-be-encoded data block, where the first target reference data block may refer to any second reference data block in the second reference data block set. If the reference flag of the multimedia data frame is the first reference flag, the data block having the strongest correlation with the to-be-encoded data block is searched from the first reference data block set and the second reference data block set. As a first target reference data block matching attribute information of the to-be-encoded data block, the first target reference data block is determined from the first reference data block set and the second reference data block set. If the reference flag of the multimedia data frame is the second reference flag. A data block having the strongest correlation with the to-be-encoded data block is searched from the second reference data block set as a first target reference data block matching the attribute information of the to-be-encoded data block, where the first target reference data block may refer to any second reference data block in the second reference data block set. According to the reference flag of the multimedia data frame, the reference data block matching with the to-be-encoded data block is adaptively selected, which is beneficial to improve the accuracy and flexibility of obtaining the reference data block.

Matching mode 3, when the attribute information of the to-be-encoded data block includes the definition of the multimedia data frame to which the to-be-encoded data block belongs, When the definition of the multimedia data frame to which the to-be-encoded data block belongs is greater than the definition threshold value, indicating that the user has higher requirements for the quality of the multimedia data frame, a first target reference data block matching with the attribute information of the to-be-encoded data block can be obtained from the first reference data block set or the third reference data block set. When the definition of the multimedia data frame to which the to-be-encoded data block belongs is less than or equal to the definition threshold, indicating that the quality requirement of the multimedia data frame is relatively low by the user, a first target reference data block matching the attribute information of the to-be-encoded data block can be obtained from the second reference data block set. The definition of multimedia data frames can be used for reflecting the quality requirements of users for multimedia data frames. Therefore, adaptively selecting the first target reference data block according to the definition of the multimedia data frame is equivalent to adaptively selecting the first target reference data block according to the quality requirement of the user for the multimedia data frame, which is beneficial to improving the flexibility and accuracy of the selected reference data block.

It should be noted that, when the media type of the multimedia data frame is a non-intra type. A reference flag of the multimedia data frame is a second reference flag, or, when the definition of the multimedia data frame is less than or equal to the definition threshold. A computer device may obtain a first target reference data block from a second reference data block set that matches attribute information of the to-be-encoded data block. At this time, the computer device can only store the second reference data block set without storing the first reference data block set, thus saving the storage space of the computer device, reducing the search range of the reference data block and improving the efficiency of searching the reference data block.

In some embodiments, the computer device may obtain the first reference data block set from one of the following two modes according to the encoding mode of the multimedia data frame:

Manner 1: The first reference data block set includes one or more first reference data blocks; in response to a coding mode of the multimedia data frame being a serial coding mode, the first reference data block is an encoded data block whose parameter association relationship in the multimedia data frame satisfies a write-back limitation condition and which belongs to the same tile as the to-be-encoded data block; the parameter association relationship is used for indicating or reflecting an association relationship among first position information, size information of a superblock and second position information The parameter association relationship may also be considered as a combination of first position information, size information of a superblock and second position information. That is, in each parameter association relationship, there is a combination of first position information, size information of a superblock and second position information. The first position information and the second position information being position information of an encoded data block and of the to-be-encoded data block in the multimedia data frame respectively; and the write-back limitation condition is used for indicating or reflecting a delay limitation (or requirement) for writing the encoded data block to the first reference data block set. The delay requirement may include, for example, a maximum delay that is acceptable to meet an encoding/decoding performance requirement. Note that the delay limitation may be preconfigured, or be determined dynamically based on, a type or a service requirement of the multimedia data frame, or be determined based on the hardware capability of the encoding/decoding device. That is to say, the serial coding means that only one data block in the multimedia data frame is predictive coded at the same time. If the coding mode of the multimedia data frame is serial coding mode, the coding mode will not affect the determination process of the reference data block. However, writing the encoded data block to the first reference data block set causes a large write-back delay. That is, it takes a long time for the encoded data block to be written into the first reference data block set. Therefore, after the encoded data block waits for at least a preset time, can be used as a reference data block, the preset duration is determined based on a limited delay for writing the encoded data block to the first reference data block set, which may be one of an average delay, a maximum delay, a minimum delay, and the like for writing the encoded data block to the first reference data block set. Therefore, when the coding mode of the multimedia data frame is a serial coding mode, the first reference data block in the first reference data block set needs to satisfy the following two conditions: A, belonging to the same tile as the to-be-encoded data block; B, the parameter association relationship satisfies the write-back limitation condition.

During implementation, the computer device may perform the following steps to obtain a first reference data block set: acquiring first position information, size information of a superblock and second position information respectively in response to a coding mode of the multimedia data frame being a serial coding mode, the first position information and the second position information being position information of an encoded data block and of the to-be-encoded data block in the multimedia data frame respectively; acquiring a write-back limitation condition, the write-back limitation condition being used for reflecting a delay limitation or requirement for writing the encoded data block to the first reference data block set; selecting an encoded data block whose parameter association relationship satisfies the write-back limitation condition and which belongs to the same tile as the to-be-encoded data block from the multimedia data frame as a first reference data block, the parameter association relationship being used for reflecting an association relationship among the first position information, the size information of the superblock and the second position information; and adding the first reference data block to the first reference data block set. Note that this process may apply to and be repeated for multiple encoded data blocks in the multimedia data frame. There may be one or more encoded data blocks that qualified the condition to be selected as a first reference data block. That is, one or more encoded data blocks that qualified the condition may be added to the first reference data block set. More details will be described below for determining the qualification of encoded data blocks be to add to the first reference data block set.

In the embodiment of this disclosure, when the coding mode of the multimedia data frame is a serial coding mode, the computer equipment can respectively obtain the first position information, the size information of the superblock and the second position information. The first position information and the second position information respectively refer to the position information of the encoded data block and the to-be-encoded data block in the multimedia data frame. The first position information and the second position information may refer to the upper left corner pixel of the encoded data block, the coordinates of the upper left corner pixel of the to-be-encoded data block in the multimedia data frame, and the size information of the superblock may refer to the width and height of the superblock. And, the computer device can acquire the write-back limitation condition. A coded data block whose parameter correlation satisfies write-back limitation condition and belongs to the same tile as the to-be-encoded data block is screened out from the multimedia data frame as a first reference data block, and the first reference data block is added to the first reference data block set. That is, the parameters associated with the encoded block (e.g., first position information, second position information, size information) are considered as a whole, to determine whether the encoded block satisfies the write-back limitation condition. The first reference data block is obtained by filtering according to the write-back limitation condition, the first position information, the second position information and the size information of the superblock, which can ensure that the first reference data block and the to-be-encoded data block have strong spatial correlation and can ensure the availability of the first reference data block. Note that the screening/ filtering process may be applied to multiple encoded data blocks in the multimedia data frame. For example, for each encoded data block belonging to the same tile as the to-be-encoded data block, the screening/filtering process may be applied. In some example implementations, the computer equipment may first select encoded data block(s) from a multimedia data frame, then perform the screening/filtering process. In some example implementations, the computer equipment may first select encoded data block(s) from a same tile, then perform the screening/filtering process.

In some embodiments, filtering the first reference data block may be implemented in the following ways: First, according to the first position information and the second position information, encoded data blocks belonging to the same encoded slice are screened out from the multimedia data frames as first candidate reference data blocks. Then, a data block limit number of intervals (i.e., a data block interval threshold, restriction, or limitation) between the encoded data block and the to-be-encoded data block in the multimedia data frame under the write-back limitation condition is determined. Then, the number of data blocks between the first candidate reference data block and the to-be-encoded data block is counted according to the first position information, the size information of the superblock and the second position information. Finally, the first candidate reference data block whose number of interval data blocks is greater than the limited number of interval data blocks is determined as the first reference data block. Note that the number of data blocks between the first candidate reference data block and the to-be-encoded data block may also be referred to as a distance, or block distance between the first candidate reference data block and the to-be-encoded data block. The distance may be represented by the aforementioned number of interval data blocks.

Here, it is assumed that the first position information, the second position information may refer to the pixels of the encoded data block, the pixels of the to-be-encoded data block at the coordinates of the multimedia data frame. The position information of the encoded data block is (ref_x, ref_y), and the position information of the to-be-encoded data block is (cur_x, cur_y). The computer device can filter out the encoded data block belonging to the same tile as the to-be-encoded data block from the multimedia data frame as the first candidate reference data block. A data block encoded in the multimedia data frame under the write-back limitation is determined. The limited number of data blocks with the to-be-encoded data block may be the minimum number of data blocks that should be spaced between the encoded data blocks in the multimedia data frame and the to-be-encoded data block under the condition of satisfying the write-back limitation. Then, according to the first position information, the size information of the superblock and the second position information. The number of interval data blocks between the first candidate reference data block and the to-be-encoded data block is counted. The number of data blocks refers to the number of data blocks actually spaced between the first candidate reference data block and the to-be-encoded data block, and the first candidate reference data block whose number of data blocks is greater than the limited number of data blocks is determined as the first reference data block. The first reference data block set is acquired through the position information of the encoded data block, the position information of the to-be-encoded data block and the write-back delay restriction condition, etc., which can ensure that the first reference data block and the to-be-encoded data block have strong spatial correlation and can ensure the availability of the first reference data block. At the same time, no additional hardware cost is needed, which can save the cost.

For example, the computer device may determine a first candidate reference data block satisfying the following formula (2) as a first reference data block:

$$D < cur\_num - src\_num \tag{2}$$

Formula (2) indicates the number of data blocks between the first candidate reference data block and the to-be-encoded data block, cur_num and src_num respectively refer to the number of the first candidate reference data block and the number of the to-be-encoded data block, D refers to the limited number of data blocks under the condition of satisfying the write-back limitation, and cur_num and src_num can be calculated by the following formulas (3) and (4).

In some embodiments, the above statistics of the number of data blocks between the first candidate reference data block and the to-be-encoded data block may be achieved by: first, determining a row identifier and a column identifier of each of the first candidate reference data blocks according to the first position information and the size information of the superblock; then, determining a row identifier and a column identifier of the to-be-encoded data block according to the second position information and the size information of the superblock (or largest encoding block); afterward, determining a number of data blocks in each row in the multimedia data frame based on size information of the to-be-encoded data block; and finally, counting the number of data blocks between the first candidate reference data block and the to-be-encoded data block according to the number of data blocks in each row, the row identifier and the column identifier of each of the first candidate reference data blocks, and the row identifier and the column identifier of the to-be-encoded data block. In some implementations, the largest encoding block may be the superblock.

Here, the row identifiers and column identifiers of the first candidate reference data block are ref_y_num and ref_x_num, respectively, and the row identifiers and column identifiers of the to-be-encoded data block are cur_y_num and cur_x_num, respectively. The computer device can obtain the row identifiers and column identifiers of the first candidate reference data block and the row identifiers and column identifiers of the to-be-encoded data block, respectively, by adopting the following formula (3):

$$\begin{cases} \text{cur\_y\_num} = \text{Floor}\left(\text{cur\_y/H}\right) \\ \text{cur\_x\_num} = \text{Floor}\left(\text{cur\_x/W}\right) \\ \text{ref\_y\_num} = \text{Floor}\left(\text{ref\_y/H}\right) \\ \text{ref\_x\_num} = \text{Floor}\left(\text{ref\_x/W}\right) \end{cases} \quad (3)$$

Where Floor ( ) in formula (3) represents downward rounding, W and H can be determined in any of the following four ways: Mode 1, W and H are determined according to the size information of the superblock; In the second way, W and H are determined according to the size information of VPDU (Virtual Pipeline Data Units) of on-chip memory; In Mode 3, H may be determined by referring to the size information of the superblock. For example, the superblock is 128×128 and H is 128; The superblock is 64×64, H is 64, and W can be the default value (such as 64). Mode 4, W and H are default values, which can be 4, 64, 128, etc. A superblock may include one or more data blocks, and the size of the superblock and the size of the data block may be determined according to the blocking manner of the multimedia data frame.

The computer device may determine the number of data blocks per row in the multimedia data frame based on the size information of the to-be-encoded data block; According to the number of data blocks per row, row identifiers and column identifiers of the first candidate reference data block, a number of the first candidate reference data block is determined, and determining the number of to-be-encoded data block according to the number of data blocks in each row and the row identifiers and column identifiers of the to-be-encoded data block. The difference between the number of the first candidate reference data block and the number of the to-be-encoded data block is determined as the number of data blocks between the first candidate reference data block and the to-be-encoded data block. For example, the computer device may determine the number of data blocks per row in the multimedia data frame, the number of the first candidate reference data block and the number of the to-be-encoded data block using the following formula (4):

$$\begin{cases} \text{stride} = \text{Ceil}\left(\text{tile\_w/W}\right) \\ \text{cur\_num} = \text{cur\_y\_num} * \text{stride} + \text{cur\_x\_num} \\ \text{src\_num} = \text{ref\_y\_num} * \text{stride} + \text{ref\_x\_num} \end{cases} \quad (4)$$

Stride in formula (4) refers to the number of data blocks per row in the multimedia data frame, Cur_num, src_num refer to the number of the first candidate reference data block and the number of the to-be-encoded data block, respectively, Ceil ( ) represents upward rounding, and tile_w represents the width of the encoded slice, which includes one or more largest encoded blocks, so that the width of the encoded slice can be determined according to the size information of the superblock (or largest encoded block). For example, when the superblock size is 128×128, the tile can be 1024×720. In some implementations, the largest encoded block may be the encoded superblock. In some implementations, the largest encoded block may be smaller than a superblock, for example, if a whole superblock has not been encoded yet.

It should be noted that, When the coding mode of the multimedia data frame is a serial coding mode, the computer device can also obtain the first reference data block set by: According to the first position information, the second position information and the size information of the superblock, The interval distance between the encoded data block and the to-be-encoded data block is determined, and determining the interval limit distance between the encoded data block and the to-be-encoded data block under the condition of write-back delay. The interval limit distance refers to the minimum interval distance between the encoded data block and the to-be-encoded data block under the condition of satisfying the write-back delay. An encoded data block belonging to the same tile as the to-be-encoded data block in the multimedia data frame and having an interval greater than the interval limit distance is used as a first reference data block, and the first reference data block is added to the first reference data block set.

In some embodiments, the first reference data block set includes one or more second reference data blocks; in response to a coding mode of the multimedia data frame being a parallel coding mode or a serial coding mode, the second reference data block is an encoded data block which belongs to the same tile as the to-be-encoded data block and whose parameter association relationship in the multimedia data frame satisfies a write-back limitation condition and an encoding processing condition; the parameter association relationship is used for reflecting an association relationship among respective position information of an encoded data block and of the to-be-encoded data block in the multimedia data frame and size information of the superblock; and the write-back limitation condition being used for reflecting a delay limitation or requirement for writing the encoded data block to the first reference data block set. That is to say, parallel coding means predictive coding of multiple data blocks in multimedia data frames at the same time. If the coding mode of multimedia data frames is parallel coding mode, this coding mode will affect the determination process of reference data blocks. At the same time, writing the encoded data block into the first reference data block set will bring a larger write-back delay. Therefore, when the coding mode of the multimedia data frame is a parallel coding mode, the second reference data block in the first reference data block set needs to meet the following three conditions: A, belonging to the same tile as the to-be-encoded data block; B, the parameter association relationship satisfies the write-back limitation condition; C, the parameter association relationship satisfies the coding processing condition. In some embodiments, when the coding mode of the multimedia data frame is a serial coding mode or a parallel coding mode, the method of obtaining the first reference data block set can be adopted. The encoding processing condition herein may refer to a parallel encoding processing condition.

In an embodiment of this disclosure, the computer device may perform the following steps to obtain a first reference data block set: acquiring first position information, size information of a superblock and second position information respectively, the first position information and the second position information being position information of an encoded data block and of the to-be-encoded data block in the multimedia data frame respectively; then, acquiring a write-back limitation condition and an encoding processing condition, the write-back limitation condition being used for reflecting a delay limitation or requirement for writing the encoded data block to the first reference data block set; afterward, selecting an encoded data block whose parameter association relationship satisfies the write-back limitation condition and the encoding processing condition and which belongs to the same tile as the to-be-encoded data block from the multimedia data frame as a second reference data block, the parameter association relationship being used for reflecting an association relationship among the first position information, size information of the to-be-encoded data block and the second position information; and finally, adding the second reference data block to the first reference data block set.

Here, the first position information and the second position information may refer to the upper left corner pixel of the encoded data block, the coordinates of the upper left corner pixel of the to-be-encoded data block in the multimedia data frame, and the size information of the superblock may refer to the width and height of the superblock. The write-back limiting condition is used for reflecting the limiting time delay of writing the encoded data block to the first reference data block set, and the encoding processing condition is used for reflecting the limiting distance between the reference data block and the to-be-encoded data block when the multimedia data frame is encoded in parallel. Alternatively, the encoding processing condition is used for reflecting the limited number of data blocks between the reference data block and the to-be-encoded data block when the multimedia data frame is encoded in parallel. By sifting out the parameter association relationship from the multimedia data frame to satisfy the write-back limitation condition and the coding processing condition, The encoded data block belonging to the same tile as the to-be-encoded data block is used as a second reference data block, and the second reference data block is added to the first reference data block set, which can ensure that the second reference data block and the to-be-encoded data block have strong spatial correlation and can ensure the availability of the second reference data block.

In some embodiments, filtering the second reference data block may be implemented in the following ways: selecting, from the multimedia data frame, encoded data blocks belonging to the same tile as the to-be-encoded data block as first candidate reference data blocks according to the first position information and the second position information; then, selecting the first candidate reference data block whose parameter association relationship satisfies the write-back limitation condition among the first candidate reference data blocks as second candidate reference data blocks; afterward, determining a first data block limitation distance between an encoded data block and the to-be-encoded data block in the multimedia data frame under the write-back limitation condition; determining a second data block limitation distance between an encoded data block and the to-be-encoded data block in the multimedia data frame under the encoding processing condition; and finally, determining the second candidate reference data block satisfying the encoding processing condition among the second candidate reference data blocks as the second reference data block according to the first position information, the size information of the superblock, the second position information, the first data block limitation distance and the second data block limitation distance.

Here, it is assumed that the first position information, the second position information may refer to the pixels of the encoded data block, the pixels of the to-be-encoded data block at the coordinates of the multimedia data frame, the position information of the encoded data block is (ref_x, ref_y), and the position information of the to-be-encoded data block is (cur_x, cur_y). The computer device can filter out the encoded data block belonging to the same tile as the to-be-encoded data block from the multimedia data frame as the first candidate reference data block. In an embodiment of this disclosure, the computer device can screen out a first candidate reference data block whose coordinates satisfy the formula (2) as a second candidate reference data block from the first candidate reference data blocks. An encoded block of data in a multimedia data frame under write-back constraints may be determined. A first data block limitation distance with the to-be-encoded data block, where the first data block limitation distance can refer to the minimum distance between the encoded data block in the multimedia data frame and the to-be-encoded data block under the condition that the write-back delay limit is met. A second data block limitation distance between the encoded data block and the to-be-encoded data block in the multimedia data frame under the encoding processing condition is determined. The second data block limitation distance refers to the minimum distance that should be maintained between the encoded data block and the to-be-encoded data block in the multimedia data frame under the encoding processing condition. Then, according to the first position information, the size information of the superblock, the second position information, the first data block limitation distance and the second data block limitation distance, a second candidate reference data block satisfying the encoding processing condition can be determined as a second reference data block from the second candidate reference data blocks.

In some embodiments, the determination of a second candidate reference data block satisfying the encoding processing conditions from the second candidate reference data blocks as the second reference data block may also be realized in the following manner: determining a row identifier and a column identifier of each of the second candidate reference data blocks according to the first position information and the size information of the superblock; determining a row identifier and a column identifier of the to-be-encoded data block according to the second position information and the size information of the superblock (or largest encoding block); then, selecting the second candidate reference data blocks whose row identifier is less than or equal to the row identifier of the to-be-encoded data block among the second candidate reference data blocks as third candidate reference data blocks; afterward, determining a row distance between each of the third candidate reference data blocks and the to-be-encoded data block according to the row identifier of each of the third candidate reference data blocks and the row identifier of the to-be-encoded data block; determining a column distance between each of the third candidate reference data blocks and the to-be-encoded data block according to the column identifier of each of the third candidate reference data blocks and the column identifier of the to-be-encoded data block; and finally, determining the third candidate reference data block whose column distance is less than a first distance threshold among the third candidate reference data blocks as the second reference data block, the first distance threshold being determined according to the first data block limitation distance, the second data block limitation distance, and the row distance between each of the third candidate reference data blocks and the to-be-encoded data block.

Here, the computer device may obtain row identifiers and column identifiers of the second candidate reference data block, row identifiers and column identifiers of the to-be-encoded data block, respectively, using the above formula (3). Then, a second candidate reference data block whose travel identifier is less than or equal to the row identifier of the to-be-encoded data block may be screened from the second candidate reference data blocks as a third candidate reference data block. In an embodiment of this disclosure. A difference between the row identifiers of the third candidate reference data block and the row identifiers of the to-be-encoded data block. Determining a row distance between the third candidate reference data block and the to-be-encoded data block, and determining a difference between the column identifiers of the third candidate reference data block and the column identifiers of the to-be-encoded data block as a column distance between the third candidate reference data block and the to-be-encoded data block. The third candidate reference data block whose column distance is less than the first distance threshold in the third candidate reference data block is determined as the second reference data block. For example, the computer device may determine as the first reference data block a second candidate reference data block whose coordinates satisfy the following formula (5):

$$\begin{cases} \text{ref\_y\_num} <= \text{cur\_y\_num} \\ \text{ref\_x\_num} - \text{cur\_x\_num} < -P + (P+E)*(\text{cur\_y\_num} - \text{ref\_y\_num}) \end{cases} \quad (5)$$

In formula (5), Ref_y_num and ref_x_num respectively refer to row identifiers and column identifiers of the second candidate reference data block, Cur_y_num and cur_x_num refer to row identifiers and column identifiers of to-be-encoded data block, P refers to the first data block limitation distance between the encoded data block in the multimedia data frame and the to-be-encoded data block under the write-back limiting condition, and E refers to the second data block limitation distance between the encoded data block in the multimedia data frame and the to-be-encoded data block under the encoding processing condition. The first data block limitation distance can be determined according to the number of data blocks limited by the interval between the encoded data blocks in the multimedia data frame and the to-be-encoded data block under the write-back limiting condition, for example, P and D can be the same numerically. The second data block limitation distance is determined by limiting the number of data blocks according to the interval between the encoded data blocks and the to-be-encoded data block in the multimedia data frame under the encoding processing condition. Represents a column distance between a third candidate reference data block and the to-be-encoded data block, and a row distance between the third candidate reference data block and the to-be-encoded data block.

It should be noted that, when the coding mode of the multimedia data frame is a parallel coding mode or a serial coding mode, the computer device can also obtain the first reference data block set by: According to the first position information, the second position information and the size information of the superblock, determining the number of data blocks between the encoded data block and the to-be-encoded data block, and determining the target interval between the encoded data block and the to-be-encoded data block under the write-back delay condition and the encoding processing condition to limit the number of data blocks. The number of target interval limited data blocks refers to the minimum number of interval data blocks between encoded data blocks and to-be-encoded data block under the conditions of write-back delay and encoding processing, encoded data blocks belonging to the same tile as the to-be-encoded data block in the multimedia data frame and having a number of data blocks greater than the number of target spaced limited data blocks are added to the first reference data block set.

In some embodiments, the computer device may select one or at least a combination of two manners to obtain a second reference data block set:

Manner 1: The second reference data block set includes one or more third reference data blocks, the third reference data blocks being encoded data blocks in the multimedia data frame located in the same encoding processing unit as the to-be-encoded data block. The encoding processing unit can also be referred to as a basic unit of on-chip memory (VPDU, Virtual Pipeline Data Units), and the size information of the VPDU can be determined according to the encoding processing capability of the encoder, for example, the size of the VPDU is VPDU_W*VPDU_H, and the values of both VPDU_W and VPDU_H can be 4, 8, 16, 32, 64, 128, etc. That is, an encoded data block in a multimedia data frame whose coordinates satisfy ref_x/VPDU_W=cur_x/VPDU_W and ref_y/VPDU_H=cur_y/VPDU_H is used as a second reference data block. For another example, if the size of the VPDU is 64×64, the encoded data blocks in the VPDU 64×64 to which the to-be-encoded data block belongs can be used as reference data blocks of the to-be-encoded data block. Alternatively, if the size of the VPDU is 64×64, an encoded data block in the multimedia data frame whose coordinates satisfy Floor (ref_x/64)=Floor (cur_x/64) and Floor (ref_y/64)=Floor (cur_y/64) is taken as the third reference data block.

In some embodiments, each pixel of a reference data block of a to-be-encoded data block of a multimedia data frame may be located in the same VPDU.

Manner 2: The second reference data block set includes one or more fourth reference data blocks, where the fourth reference data blocks are coded data blocks in the multimedia data frame having a neighbor relationship with the to-be-encoded data block and belonging to the same tile as the to-be-encoded data block. Having a neighbor relationship between the second reference data block and the to-be-encoded data block may include one or a combination of the following three cases: A, the fourth reference data block and the to-be-encoded data block have a neighbor relationship, which means: The fourth reference data block and the to-be-encoded data block belong to the same superblock. B, the fourth reference data block and the to-be-encoded data block have a neighbor relationship, which means: The fourth reference data block is located in N superblocks adjacent to the to-be-encoded data block, and the size of the superblock is smaller than the size threshold. For example, the encoding direction of the multimedia data frame is from left to right, and the size threshold can be set according to the application scene dynamics or user requirements. If the size threshold can be 128×128, the first reference data block and the to-be-encoded data block have a neighbor relationship, which means: The fourth reference data block is located within N superblocks to the left of the to-be-encoded data block, and the size of the superblock is less than 128×128. Calculation may be performed based on the following formula (1-6):

$$\begin{cases} \log 2\_sb\_size = \log 2(sb\_size) \\ N = (1 \ll ((7 - \log 2\_sb\_size) \ll 1)) - (((\log 2\_sb\_size) < 7)?1:0) \end{cases} \quad (6)$$

Where log2_sb_size is the intermediate variable and sb_size is the size of the superblock (or largest encoding block).

C, the fourth reference data block and the to-be-encoded data block have a neighbor relationship, which means: The fourth reference data block is located in N superblocks adjacent to the to-be-encoded data block, and the size of the superblock is greater than or equal to a size threshold; In the multimedia data frame, if the fourth reference data block moves to the first direction (for example, moves to the right) by a superblock, the data block located in the uppermost corner (for example, the upmost left corner) in the second direction in the area where the moved fourth reference data block is located is the data block that has not been reconstructed. Here, the first direction and the second direction are two opposite directions, where the first direction refers to the moving direction of the fourth reference data block, and the first direction is the same as the encoding direction of the to-be-encoded data block, that is, for a row of to-be-encoded data block arranged horizontally, from left to right is the encoding direction of the to-be-encoded data block, then from left to right is the first direction and from right to left is the second direction. Position information when the fourth reference data block moves (the moving direction is the same as the encoding direction) by a distance of a superblock, which is different from the position information of the to-be-encoded data block; N is determined according to the size information of the superblock (or largest encoded block). That is, when the size of the superblock is greater than or equal to the size threshold, for example, the size of the superblock is 128×128, the fourth reference data block needs to satisfy the following three conditions: 1, encoded data blocks belonging to the same tile as the to-be-encoded data block; 2. When the coordinates are (ref_x 128, ref_y) after the fourth reference data block is moved 128 pixels to the right, the data block located in the upper left corner of the area with the coordinates of (ref_x 128, ref_y) and the size of 64×64 in the multimedia data frame is an unreconstructed data block; 3. The position information when the fourth reference data block is moved to the right by a distance of the superblock is different from the position information of the to-be-encoded data block, and the condition can be expressed by formula (7):

$$\begin{cases} \mathrm{cur\_x!} = \mathrm{Floor}\left((\mathrm{ref\_x}+128)/64\right) * 64 \\ \mathrm{cur\_y!} = \mathrm{Floor}\left(\mathrm{ref\_y}/64\right) * 64 \end{cases} \quad (7)$$

Among them, in formula (7)!=means not equal to.

In the embodiment of this disclosure, the distances between the first target reference data block and the to-be-encoded data block are all smaller than the second distance threshold. The second distance threshold may be dynamically set according to an application scenario or user requirements, e.g. the second distance threshold may be 214, while the first target reference data block is located at an integer pixel position of the multimedia data frame.

For example, when the coding mode of multimedia data frames is parallel coding mode, The size of the superblock is 128*128, The interval between the encoded data block and the to-be-encoded data block under the condition of write-back delay limitation limits the number of data blocks to 4, The interval between the encoded data block and the to-be-encoded data block under the encoding processing condition limits the number of data blocks to 2, the acquisition method of the second reference data block set is the above method 1, and the relationship among the first reference data block set, the second reference data block set and the to-be-encoded data block is shown in FIG. 8 when the size of the VPDU is 64×64. In FIG. 8, one of the smallest squares (that is, the small squares drawn by dashed lines) is 64×64 in size, the small squares drawn by solid lines are 128×128 in size, and the data blocks are 32×32 in size. Thus, the encoded data blocks in the nineteenth grid of the first row in the multimedia data frame of FIG. 8 belong to a second reference data block set for encoding the to-be-encoded data block in the nineteenth grid of the first row. The encoded data blocks in the first and second rows of the multimedia data frame, which are 8 blocks apart from the to-be-encoded data block, belong to a first reference data block set for encoding the to-be-encoded data block in the 19th grid of the first row. As can be seen from FIG. 8, The number of reference data blocks in the first reference data block set is greater than the number of reference data blocks in the second reference data block set, the reference data blocks in the first reference data block set and the to-be-encoded data block do not have a neighbor relationship, and the reference data blocks in the second reference data block set and the to-be-encoded data block have a neighbor relationship.

For example, when the coding mode of multimedia data frames is parallel coding mode, the size of the superblock is 128*128, the interval between the encoded data block and the to-be-encoded data block under the condition of write-back delay limitation limits the number of data blocks to 4, the interval between the encoded data block and the to-be-encoded data block under the encoding processing condition limits the number of data blocks to 2, the acquisition mode of the second reference data block set is the above-mentioned mode 2, and the relationship among the first reference data block set, the second reference data block set and the to-be-encoded data block is shown in FIG. 9 when the size of the VPDU is 64×64. In FIG. 9, one of the smallest squares (that is, the small squares drawn by dashed lines) is 64×64 in size, the small squares drawn by solid lines are 128×128 in size, and the data blocks are 32×32 in size. Thus, the encoded data block in the nineteenth grid of the first row in the multimedia data frame of FIG. 9, and the encoded data block in the largest encoded block to the left of the to-be-encoded data block belongs to a second reference data block set for encoding the to-be-encoded data block in the 19th grid of the first row. The encoded data blocks in the first and second rows of the multimedia data frame, which are 8 blocks apart from the to-be-encoded data block, belong to a first reference data block set for encoding the to-be-encoded data block in the 19th grid of the first row. As can be seen from FIG. 9, The number of reference data blocks in the first reference data block set is greater than the number of reference data blocks in the second reference data block set, the reference data blocks in the first reference data block set and the to-be-encoded data block do not have a neighbor relationship, and the reference data blocks in the second reference data block set and the to-be-encoded data block have a neighbor relationship.

It should be noted that, If the chrominance component of the to-be-encoded data block is obtained by predictive encoding according to the luminance component of the first target reference data block, When the first target reference data block is the first reference data block, both the luminance component and the chrominance component of the first target reference data block need to satisfy the conditions related to the first reference data block, and the conditions related to the first reference data block may refer to the conditions for determining the set of the first reference data blocks. If the chrominance component of the to-be-encoded data block is obtained by predictive encoding according to the luminance component of the first target reference data block, when the first target reference data block is a second reference data block, both the luminance component and the chrominance component of the first target reference data block need to satisfy the conditions related to the second reference data block, and the conditions related to the second reference data block may refer to the conditions for determining the second reference data block set.

In some embodiments having a neighbor relationship between the to-be-encoded data block and the encoded data block may mean that the encoding order of the to-be-encoded data block is adjacent to the encoding order of the encoded data block. The absence of a neighbor relationship between the to-be-encoded data block and the encoded data block may mean that the encoding order of the to-be-encoded data block is not adjacent to the encoding order of the encoded data block.

In some embodiments, a plurality of to-be-encoded data blocks exist in the multimedia data frame, and the method may include: acquiring attribute information of each of the to-be-encoded data blocks in the multimedia data frame; in response to determining according to the attribute information of the to-be-encoded data blocks in the multimedia data frame that the first target reference data blocks corresponding to all the to-be-encoded data blocks in the multimedia data frame belong to the second reference data block set, performing filtering processing on the to-be-encoded data blocks in the multimedia data frame; in response to determining according to the attribute information of the to-be-encoded data blocks in the multimedia data frame that the first target reference data block corresponding to one of the to-be-encoded data blocks in the multimedia data frame is selected from the first reference data block set, stopping filtering processing on the to-be-encoded data blocks in the multimedia data frame; and in response to determining according to the attribute information of the to-be-decoded data blocks in the multimedia data frame that a first area of the second target reference data block corresponding to one of the to-be-decoded data blocks in the multimedia data frame belongs to the first reference data block set and a second area of the second target reference data block belongs to the second reference data block set, stopping filtering processing on the to-be-decoded data blocks in the multimedia data frame. That is, at the encoding end, when all the data blocks in the multimedia data frame are encoded by the reference data blocks in the second reference data block set, the loop filter is allowed to filter the multimedia data frame, which is beneficial to improving the quality of the multimedia data frame. When a data block in the multimedia data frame is present, the reference data block in the first reference data block set is encoded, Alternatively, when a data block in a multimedia data frame has a first target reference data block portion belonging to a first reference data block set, and partially belongs to the second reference data block set, the multimedia data frame is prohibited from being filtered by using the loop filter. By prohibiting the multimedia data frame from being processed by using the loop filter, additional image storage requirements are avoided, which is beneficial to saving storage space. Deblocking filter (DBF, Deblocking filter), Sample Adaptive Offset (SAO, Sample Adaptive Offset), Adaptive Loop Filter (ALF, Adaptive Loop Filter), constrained directional enhancement (CDEF, loop restoration Filter (LR, loop restoration), Cross Component Sample Offset (CCSO, Cross Component Sample Offset), etc.

FIG. 10 is a flowchart of a voice data processing method according to an embodiment of this disclosure. As shown in FIG. 10, the method may include the following steps:

S201. The attribute information of the to-be-decoded data block in the multimedia data frame is acquired.

In an embodiment of this disclosure, the computer device can acquire attribute information of a to-be-decoded data block in the multimedia data frame. The to-be-decoded data block may refer to the current encoded data block described above, and the to-be-decoded data block may refer to a to-be-encoded data block among the unencoded data blocks in the multimedia data frame, i.e., the to-be-decoded data block may refer to the unencoded data block closest to the decoded data block in the multimedia data frame.

The attribute information of the to-be-decoded data block includes one or more of the media type of the multimedia data frame to which the to-be-decoded data block belongs, the reference flag of the multimedia data frame, the definition of the multimedia data frame to which the to-be-decoded data block belongs, and the like; The media types include Intra and non-Intra, the Intra type may refer to multimedia data frames with representative meaning, and the Intra type includes full Intra encoded frames, Intra frames, I frames and key frames. Intra-type frames only allow intra-coding technology, and do not need to rely on other frames for coding. For example, the intra type may refer to a multimedia data frame capable of embodying a major meaning in video data or image data. The non-intra type may refer to multimedia data frames other than intra types in video data or image data, and may be referred to as inter-encoded frames, P frames, B frames, or non-key frames. Non-intra-frame type frames allow the use of inter-frame coding technology and intra-frame coding technology. Usually, when inter-frame coding technology is adopted, the reference frame can be encoded only after the coding is completed. The reference flag of the multimedia data frame is used for reflecting the selection range of the reference data block of the to-be-decoded data block.

S202. Acquire a second target reference data block matching the attribute information of the to-be-decoded data block; the second target reference data block being selected from a first reference data block set, a second reference data block set, or a third reference data block set integrating the first reference data block set and the second reference data block set, the first reference data block set including decoded data blocks not having a neighbor relationship with the to-be-decoded data block, and the second reference data block set including decoded data blocks having a neighbor relationship with the to-be-decoded data block.

In an embodiment of this disclosure, a decoded data block in which the multimedia data frame does not have a neighbor relationship with the to-be-decoded data block, a decoded data block in which the to-be-decoded data block has a neighbor relationship with the to-be-decoded data block can be used as a reference data block. A computer device can improve flexibility and accuracy in obtaining a reference data block by adaptively selecting a second target reference data block from a decoded data block having a neighbor relationship and a decoded data block having no neighbor relationship according to attribute information of the to-be-decoded data block.

It should be noted that, the decoded data block in the embodiment of this disclosure can also be called the reconstructed data block at the decoding end, and the reconstructed data block refers to the data block after the decoded data block is restored. The second target reference data block may refer to a decoded data block having a neighbor relationship with the to-be-decoded data block. Alternatively, the second target reference data block may refer to a decoded data block that does not have a neighbor relationship with the to-be-decoded data block. Alternatively, the second region of the second target reference data block belongs to decoded data blocks having a neighbor relationship with the to-be-decoded data block, and the second region of the second target reference data block may belong to decoded data blocks having no neighbor relationship with the to-be-decoded data block.

S203. Decode the to-be-decoded data block according to the second target reference data block.

In an embodiment of this disclosure, the computer device may, according to the position information of the second target reference data block, the to-be-decoded data block in the multimedia data frame. A block vector between the second target reference data block and the to-be-decoded data block is determined based on the position information, Then, the predicted signal of the to-be-decoded data block is obtained according to the block vector and the second target reference data block prediction, and the predicted signal and the residual signal of the to-be-decoded data block are added to obtain the original signal of the to-be-decoded data block. By decoding the to-be-decoded data block, it is beneficial to remove the multimedia data frame for recovery processing, and improve the quality of the multimedia data frame.

It should be noted that, generally, the video data includes a plurality of multimedia data frames, or the image data includes a plurality of multimedia data frames, but the to-be-decoded data block and the second target reference data block all belong to the same multimedia data frame.

In an embodiment of this disclosure, a computer device obtains a second target reference data block that matches attribute information of the to-be-decoded data block, the second target reference data block belonging to a first reference data block set, a second reference data block set, or a third reference data block set that fuses the first reference data block set and the second reference data block set; That is, the selectable reference data block set includes a first reference data block set, a second reference data block set, and a third reference data block set, extending the selection range of the reference data blocks; At the same time, according to the attribute information of the to-be-decoded data block, the second target reference data block is adaptively selected, and the to-be-decoded data block is decoded according to the second target reference data block, so that the flexibility and accuracy of obtaining the second target reference data block can be improved, and the decoding performance of multimedia data frames can be improved. At the same time, by decoding the to-be-decoded data block according to the second target reference data block, it is beneficial to restore the multimedia data frame and improve the quality of the multimedia data frame.

In some embodiments, the computer device may obtain a second target reference data block that matches the attribute information of the to-be-decoded data block by one or more combinations of the following three matching modes:

Matching manner 1: If the media type of the multimedia data frame is an intra-frame type, obtaining a second target reference data block matching the attribute information of the to-be-decoded data block from the first reference data block set or the third reference data block set; The second target reference data block is determined according to the first reference data block and the second reference data block; If the media type of the multimedia data frame is a non-intra type, a second target reference data block matching the attribute information of the to-be-decoded data block is obtained from the second reference data block set. a neighbor relationship between the to-be-decoded data block and the decoded data block may mean that the decoding order of the to-be-decoded data block is adjacent to the decoding order of the decoded data block. The absence of a neighbor relationship between the to-be-decoded data block and the decoded data block may mean that the decoding order of the to-be-decoded data block is not adjacent to the decoding order of the decoded data block.

It should be noted that, a first reference data block set and a second reference data block set are stored in a first storage space and a second storage space, respectively. The first storage space and the second storage space may be located in the same computer device or in different computer devices.

In the matching mode one, if the media type of the multimedia data frame is an intra-frame type, a data block having the strongest correlation with the to-be-decoded data block can be searched from the first reference data block set as a second target reference data block matching the attribute information of the to-be-decoded data block. If the media type of the multimedia data frame is a non-intra type, a data block having the strongest correlation with the to-be-decoded data block is searched from the second reference data block set as a second target reference data block matching the attribute information of the to-be-decoded data block. According to the media type of the multimedia data frame, the reference data block matching with the to-be-decoded data block is adaptively selected, which is beneficial to improve the accuracy and flexibility of obtaining the reference data block.

Matching manner 2: The attribute information of the to-be-decoded data block includes a reference flag of the multimedia data frame to which the to-be-decoded data block belongs; and The acquiring, by the computer device, a second target reference data block matching the attribute information of the to-be-decoded data block includes: acquiring the second target reference data block matching the attribute information of the to-be-decoded data block from the first reference data block set or the third reference data block set, in response to the reference flag of the multimedia data frame being a first reference flag; and acquiring the second target reference data block matching the attribute information of the to-be-decoded data block from the second reference data block set, in response to the reference flag of the multimedia data frame being a second reference flag. The reference flag may be preset by the sender (or receiver) of the multimedia data frame. Therefore, adaptively selecting the second target reference data block according to the reference flag is equivalent to adaptively selecting the second target reference data block according to the coding requirement of the user, which is beneficial to improving the flexibility and accuracy of the selected reference data block.

The first reference flag is used for indicating that the selection range of the reference data block of the to-be-decoded data block is the first reference data block set or the third reference data block set, and the second reference flag is used for indicating that the selection range of the reference data block of the to-be-decoded data block is the second reference data block set. The first reference flag and the second reference flag may be preset by the sender (or receiver) of the multimedia data frame, and the first reference flag and the second reference flag may be composed of one or more of characters, letters and Chinese characters.

In the second matching mode, if the reference flag of the multimedia data frame is the second reference flag, A data block having the strongest correlation with the to-be-decoded data block is searched from the first reference data block set and the second reference data block set (i.e., the third reference data block set), as a second target reference data block matching attribute information of the to-be-decoded data block, where the second target reference data block is determined from the second reference data block set and the second reference data block set. If the reference flag of the multimedia data frame is a second reference flag, a data block having the strongest correlation with the to-be-decoded data block is searched from the second reference data block set as a second target reference data block matching the attribute information of the to-be-decoded data block. According to the reference flag of the multimedia data frame, the reference data block matching with the to-be-decoded data block is adaptively selected, which is beneficial to improve the accuracy and flexibility of obtaining the reference data block.

In the second matching mode, if the reference flag of the multimedia data frame is the second reference flag, searching a data block having the strongest correlation with the to-be-decoded data block from the first reference data block set as a second target reference data block matching the attribute information of the to-be-decoded data block, where the second target reference data block refers to any reference data block in the first reference data block set. If the reference flag of the multimedia data frame is the second reference flag, a data block having the strongest correlation with the to-be-decoded data block is searched from the second reference data block set as a second target reference data block matching the attribute information of the to-be-decoded data block, where the second target reference data block may refer to any reference data block in the second reference data block set. According to the reference flag of the multimedia data frame, the reference data block matching with the to-be-decoded data block is adaptively selected, which is beneficial to improve the accuracy and flexibility of obtaining the reference data block.

Matching mode 3, when the attribute information of the to-be-decoded data block includes the definition of the multimedia data frame to which the to-be-decoded data block belongs, When the definition of the multimedia data frame to which the to-be-decoded data block belongs is greater than the definition threshold value, indicating that the user has higher requirements for the quality of the multimedia data frame, a second target reference data block matching the attribute information of the to-be-decoded data block can be obtained from the first reference data block set or the third reference data block set. When the definition of the multimedia data frame to which the to-be-decoded data block belongs is less than or equal to the definition threshold, indicating that the quality requirement of the multimedia data frame is relatively low by the user, a second target reference data block matching the attribute information of the to-be-decoded data block can be obtained from the second reference data block set. The definition of multimedia data frames can be used for reflecting the quality requirements of users for multimedia data frames. Therefore, adaptively selecting the second target reference data block according to the definition of the multimedia data frame is equivalent to adaptively selecting the second target reference data block according to the quality requirement of the user for the multimedia data frame, which is beneficial to improving the flexibility and accuracy of the selected reference data block.

In some embodiments, the computer device may obtain a first reference data block set based on a decoding mode of the multimedia data frame from one of two modes: Manner 1: In response to a decoding mode of the multimedia data frame being a serial decoding mode, the first reference data block in the first reference data block set is a decoded data block whose parameter association relationship in the multimedia data frame satisfies a write-back limitation condition and which belongs to the same decoding tile as the to-be-decoded data block; the parameter association relationship is used for reflecting an association relationship among first position information, size information of a largest decoding block and second position information, the first position information and the second position information being position information of a decoded data block and of the to-be-decoded data block in the multimedia data frame respectively; and the write-back limitation condition being used for reflecting a delay limitation or requirement for writing the decoded data block to the first reference data block set. That is to say, the serial decoding means that only one data block in the multimedia data frame is decoded at the same time. If the decoding method of the multimedia data frame is the serial decoding method, the decoding method will not affect the determination process of the reference data block. However, writing the decoded data block to the first reference data block set results in a large write-back delay, that is, it takes a long time for the decoded data block to be written into the first reference data block set. Therefore, after the decoded data block waits for at least a preset time, can be used as a reference data block. The preset duration is determined based on a limited delay for writing the decoded data block to the first reference data block set, which may be one of an average delay, a maximum delay, a minimum delay, and the like for writing the decoded data block to the first reference data block set. Therefore, when the decoding mode of the multimedia data frame is a serial decoding mode, the first reference data block in the first reference data block set needs to satisfy the following two conditions: A, belonging to the same decoding slice as the to-be-decoded data block; B, the parameter association relationship satisfies the write-back limitation condition.

Manner 2: In response to a decoding mode of the multimedia data frame being a parallel decoding mode or a serial decoding mode, the first reference data block in the first reference data block set is a decoded data block which belongs to the same decoding tile as the to-be-decoded data block and whose parameter association relationship in the multimedia data frame satisfies a write-back limitation condition and a decoding processing condition; the parameter association relationship is used for reflecting an association relationship among respective position information of a decoded data block and of the to-be-decoded data block in the multimedia data frame and size information of the largest decoding block; and the write-back limitation condition being used for reflecting a delay limitation or requirement for writing the decoded data block to the first reference data block set. That is to say, parallel decoding means predictive decoding of multiple data blocks in multimedia data frames at the same time. If the decoding mode of multimedia data frames is parallel decoding mode, this decoding mode will affect the determination process of reference data blocks. At the same time, when the decoded data block is written into the first reference data block set, a larger write-back delay will be brought. Therefore, when the decoding mode of the multimedia data frame is a parallel decoding mode, the first reference data block in the first reference data block set needs to meet the following three conditions: A, belonging to the same decoding slice as the to-be-decoded data block; B, the parameter association relationship satisfies the write-back limitation condition; C, the parameter association relationship satisfies the decoding processing condition. Particularly, when the decoding mode of the multimedia data frame is a serial decoding mode, the first reference data block set can also be obtained by adopting the second mode. The decoding processing conditions herein may refer to parallel decoding processing conditions.

It should be noted that, the acquisition mode of the first reference data block set can be obtained by referring to the coding segment, and the repetitions are not described in detail.

In some embodiments, the computer device may select one or at least a combination of two manners to obtain a second reference data block set: Manner 1: The second reference data blocks in the second reference data block set are decoded data blocks in the multimedia data frame that are located in the same decoding processing unit as the to-be-decoded data block. Manner 2: The second reference data blocks in the second reference data block set are decoded data blocks in the multimedia data frame that have a neighbor relationship with the to-be-decoded data block and belong to the same decoding tile as the to-be-decoded data block. Having an adjacency relationship between the second reference data block and the to-be-decoded data block may be one or more of the following: A, the second reference data block and the to-be-decoded data block have a neighbor relationship, which means: The second reference data block and the to-be-decoded data block belong to the same maximum decoding block. B, the second reference data block and the to-be-decoded data block have a neighbor relationship, which means: The second reference data block is located in N maximum decoding blocks adjacent to the to-be-decoded data block, and the size of the maximum decoding block is smaller than the size threshold; N is determined according to the size information of the largest decoded block.

In some embodiments, distances between the first reference data block, the second reference data block and the to-be-decoded data block are all less than a second distance threshold; The second distance threshold may be dynamically set according to an application scenario or user requirements, for example, the second distance threshold may be 214, and the first reference data block and the second reference data block are located at the whole pixel position of the multimedia data frame. A plurality of to-be-decoded data blocks exist in the multimedia data frame, and the method includes: acquiring attribute information of each of the to-be-decoded data blocks in the multimedia data frame; in response to determining according to the attribute information of the to-be-decoded data blocks in the multimedia data frame that the second target reference data blocks corresponding to all the to-be-decoded data blocks in the multimedia data frame belong to the second reference data block set, perform filtering processing on the to-be-decoded data blocks in the multimedia data frame; in response to determining according to the attribute information of the to-be-decoded data blocks in the multimedia data frame that the second target reference data block corresponding to one of the to-be-decoded data blocks in the multimedia data frame belongs to the first reference data block set, stop filtering processing on the to-be-decoded data blocks in the multimedia data frame; and in response to determining according to the attribute information of the to-be-decoded data blocks in the multimedia data frame that a first area of the second target reference data block corresponding to one of the to-be-decoded data blocks in the multimedia data frame belongs to the first reference data block set and a second area of the second target reference data block belongs to the second reference data block set, stop filtering processing on the to-be-decoded data blocks in the multimedia data frame.

FIG. 11 is a schematic structural diagram of a multimedia data processing apparatus according to an embodiment of this disclosure. The multimedia data processing apparatus may be a computer program (including program code) running in a computer device. For example, the multimedia data processing apparatus is an application software. In this disclosure, a unit and a module may be hardware such as a combination of electronic circuitries; firmware; or software such as computer instructions. The unit and the module may also be any combination of hardware, firmware, and software. In some implementation, a unit may include at least one module. Each unit or module can be implemented using one or more processors (or processors and memory) Likewise, a processor (or processors and memory) can be used to implement one or more units or modules. Moreover, each unit or module can be part of an overall unit or module that includes the functionalities of the unit or module. The apparatus may be configured to execute the corresponding steps in the method provided in the embodiments of this disclosure. As shown in FIG. 11, the multimedia data processing apparatus may include: a first acquisition module 111, a first matching module 112, and an encoding module 113.

The first acquisition module is configured to acquire attribute information of a to-be-encoded data block in a multimedia data frame. The first matching module is configured to acquire a first target reference data block matching the attribute information of the to-be-encoded data block, the first target reference data block being selected from a first reference data block set, a second reference data block set, or a third reference data block set integrating the first reference data block set and the second reference data block set, the first reference data block set including encoded data blocks not having a neighbor relationship with the to-be-encoded data block, and the second reference data block set including encoded data blocks having a neighbor relationship with the to-be-encoded data block. The encoding module is configured to perform predictive coding on the to-be-encoded data block according to the first target reference data block.

In some embodiments, the attribute information of the to-be-encoded data block includes a media type of the multimedia data frame to which the to-be-encoded data block belongs; and the first matching module is further configured to: acquire the first target reference data block matching the attribute information of the to-be-encoded data block from the first reference data block set or the third reference data block set, in response to the media type of the multimedia data frame being an intra-frame type; and acquire the first target reference data block matching the attribute information of the to-be-encoded data block from the second reference data block set, in response to the media type of the multimedia data frame being a non-intra-frame type.

In some embodiments, the attribute information of the to-be-encoded data block includes a reference flag of the multimedia data frame to which the to-be-encoded data block belongs; and the first matching module is further configured to: acquire the first target reference data block matching the attribute information of the to-be-encoded data block from the first reference data block set or the third reference data block set, in response to the reference flag of the multimedia data frame being a first reference flag; and acquire the first target reference data block matching the attribute information of the to-be-encoded data block from the second reference data block set, in response to the reference flag of the multimedia data frame being a second reference flag.

In some embodiments, the first reference data block set includes one or more first reference data blocks; in response to a coding mode of the multimedia data frame being a serial coding mode, the first reference data block is an encoded data block whose parameter association relationship in the multimedia data frame satisfies a write-back limitation condition and which belongs to the same tile as the to-be-encoded data block; the parameter association relationship is used for reflecting an association relationship among first position information, size information of a superblock and second position information, the first position information and the second position information being position information of an encoded data block and of the to-be-encoded data block in the multimedia data frame respectively; and the write-back limitation condition is used for reflecting a delay limitation or requirement for writing the encoded data block to the first reference data block set.

In some embodiments, the first acquisition module is further configured to: acquire first position information, size information of a superblock and second position information respectively in response to a coding mode of the multimedia data frame being a serial coding mode, the first position information and the second position information being position information of an encoded data block and of the to-be-encoded data block in the multimedia data frame respectively; acquire a write-back limitation condition, the write-back limitation condition being used for reflecting a delay limitation or requirement for writing the encoded data block to the first reference data block set; select an encoded data block whose parameter association relationship satisfies the write-back limitation condition and which belongs to the same tile as the to-be-encoded data block from the multimedia data frame as a first reference data block, the parameter association relationship being used for reflecting an association relationship among the first position information, the size information of the superblock and the second position information; and add the first reference data block to the first reference data block set.

In some embodiments, the first acquisition module is further configured to: select, from the multimedia data frame, encoded data blocks belonging to the same tile as the to-be-encoded data block as first candidate reference data blocks according to the first position information and the second position information; determining a limited number of data blocks between an encoded data block and the to-be-encoded data block in the multimedia data frame under the write-back limitation condition; counting a number of data blocks between each of the first candidate reference data blocks and the to-be-encoded data block according to the first position information, the size information of the superblock and the second position information; and determining the first candidate reference data block corresponding to a number of data blocks greater than the limited number of data blocks as the first reference data block.

In some embodiments, the first acquisition module is further configured to: determine a row identifier and a column identifier of each of the first candidate reference data blocks according to the first position information and the size information of the superblock; determine a row identifier and a column identifier of the to-be-encoded data block according to the second position information and the size information of the superblock (or largest encoding block); determine a number of data blocks in each row in the multimedia data frame based on size information of the to-be-encoded data block; and count the number of data blocks between the first candidate reference data block and the to-be-encoded data block according to the number of data blocks in each row, the row identifier and the column identifier of each of the first candidate reference data blocks, and the row identifier and the column identifier of the to-be-encoded data block.

In some embodiments, the first reference data block set includes one or more second reference data blocks; the second reference data block is an encoded data block which belongs to the same tile as the to-be-encoded data block and whose parameter association relationship in the multimedia data frame satisfies a write-back limitation condition and an encoding processing condition; the parameter association relationship is used for reflecting an association relationship among respective position information of an encoded data block and of the to-be-encoded data block in the multimedia data frame and size information of the superblock; and the write-back limitation condition is used for reflecting a delay limitation or requirement for writing the encoded data block to the first reference data block set.

In some embodiments, the first acquisition module is further configured to: acquire first position information, size information of a superblock and second position information respectively, the first position information and the second position information being position information of an encoded data block and of the to-be-encoded data block in the multimedia data frame respectively; acquire a write-back limitation condition and an encoding processing condition, the write-back limitation condition being used for reflecting a delay limitation or requirement for writing the encoded data block to the first reference data block set; selecting an encoded data block whose parameter association relationship satisfies the write-back limitation condition and the encoding processing condition and which belongs to the same tile as the to-be-encoded data block from the multimedia data frame as a second reference data block, the parameter association relationship being used for reflecting an association relationship among the first position information, size information of the to-be-encoded data block and the second position information; and add the second reference data block to the first reference data block set.

In some embodiments, the first acquisition module is further configured to: select, from the multimedia data frame, encoded data blocks belonging to the same tile as the to-be-encoded data block as first candidate reference data blocks according to the first position information and the second position information; select the first candidate reference data block whose parameter association relationship satisfies the write-back limitation condition among the first candidate reference data blocks as second candidate reference data blocks; determine a first data block limitation distance between an encoded data block and the to-be-encoded data block in the multimedia data frame under the write-back limitation condition; determine a second data block limitation distance between an encoded data block and the to-be-encoded data block in the multimedia data frame under the encoding processing condition; and determine the second candidate reference data block satisfying the encoding processing condition among the second candidate reference data blocks as the second reference data block according to the first position information, the size information of the superblock, the second position information, the first data block limitation distance and the second data block limitation distance.

In some embodiments, the first acquisition module is further configured to: determine a row identifier and a column identifier of each of the second candidate reference data blocks according to the first position information and the size information of the superblock; determine a row identifier and a column identifier of the to-be-encoded data block according to the second position information and the size information of the superblock (or largest encoding block); selecting the second candidate reference data blocks whose row identifier is less than or equal to the row identifier of the to-be-encoded data block among the second candidate reference data blocks as third candidate reference data blocks; determine a row distance between each of the third candidate reference data blocks and the to-be-encoded data block according to the row identifier of each of the third candidate reference data blocks and the row identifier of the to-be-encoded data block; determine a column distance between each of the third candidate reference data blocks and the to-be-encoded data block according to the column identifier of each of the third candidate reference data blocks and the column identifier of the to-be-encoded data block; and determining the third candidate reference data block whose column distance is less than a first distance threshold among the third candidate reference data blocks as the second reference data block, the first distance threshold being determined according to the first data block limitation distance, the second data block limitation distance, and the row distance between each of the third candidate reference data blocks and the to-be-encoded data block.

In some embodiments, the second reference data block set includes one or more third reference data blocks, the third reference data blocks being encoded data blocks in the multimedia data frame that are located in the same encoding processing unit as the to-be-encoded data block; or the second reference data block set comprises one or more fourth reference data blocks, the fourth reference data blocks being encoded data blocks in the multimedia data frame that have a neighbor relationship with the to-be-encoded data block and belong to the same tile as the to-be-encoded data block.

In some embodiments, that the fourth reference data blocks have the neighbor relationship with the to-be-encoded data block means: the fourth reference data blocks and the to-be-encoded data block belong to the same superblock; or the fourth reference data blocks are located in N superblocks adjacent to the to-be-encoded data block, and a size of the superblock is less than or equal to a size threshold, N being determined according to size information of the superblock; or the fourth reference data blocks are located in N superblocks adjacent to the to-be-encoded data block, and a size of the superblock is greater than or equal to a size threshold; a data block at an upper left corner in an area where the fourth reference data block in the multimedia data frame is located after being moved rightward by one superblock is an unreconstructed data block; position information of the fourth reference data block after being moved by one superblock is different from the position information of the to-be-encoded data block; and N is determined according to size information of the superblock.

In some embodiments, distances between the first target reference data blocks and the to-be-encoded data blocks are all less than a second distance threshold; and the first target reference data block is located at an integer pixel position of the multimedia data frame.

In some embodiments, a plurality of to-be-encoded data blocks exist in the multimedia data frame, and the first acquisition module is further configured to: acquire attribute information of each of the to-be-encoded data blocks in the multimedia data frame; in response to determining according to the attribute information of the to-be-encoded data blocks in the multimedia data frame that the first target reference data blocks corresponding to all the to-be-encoded data blocks in the multimedia data frame belong to the second reference data block set, perform filtering processing on the to-be-encoded data blocks in the multimedia data frame; in response to determining according to the attribute information of the to-be-encoded data blocks in the multimedia data frame that the first target reference data block corresponding to one of the to-be-encoded data blocks in the multimedia data frame is selected from the first reference data block set, stop filtering processing on the to-be-encoded data blocks in the multimedia data frame; and in response to determining according to the attribute information of the to-be-encoded data blocks in the multimedia data frame that a first area of the first target reference data block corresponding to one of the to-be-encoded data blocks in the multimedia data frame belongs to the first reference data block set and a second area of the first target reference data block belongs to the second reference data block set, stop filtering processing on the to-be-encoded data blocks in the multimedia data frame.

According to one embodiment of this disclosure, the steps involved in the multimedia data processing method shown in FIG. 7 may be performed by the modules in the multimedia data processing apparatus shown in FIG. 11. For example, step S101 shown in FIG. 7 may be performed by the first acquisition module 111 in FIG. 11, step S102 shown in FIG. 7 may be performed by the first matching module 112 in FIG. 11, and step S103 shown in FIG. 7 may be performed by the encoding module 113 in FIG. 11.

Figure 12:
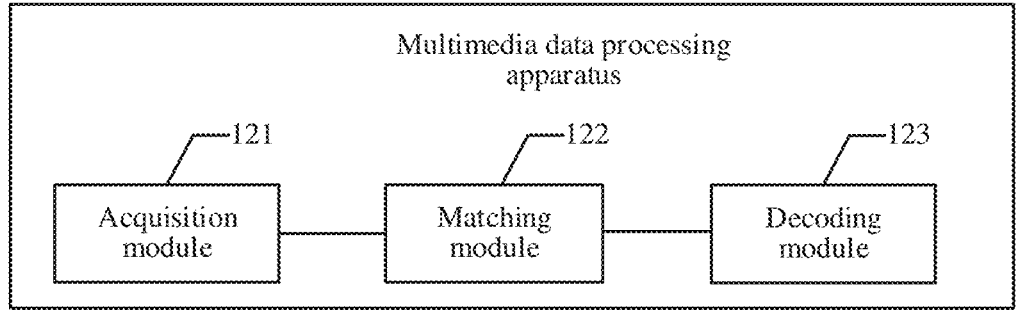
FIG. 12 is a schematic structural diagram of another multimedia data processing apparatus according to an embodiment of this disclosure.

FIG. 12 is a schematic structural diagram of another multimedia data processing apparatus according to an embodiment of this disclosure. The multimedia data processing apparatus may be a computer program (including program code) running in a computer device. For example, the multimedia data processing apparatus is an application software. The apparatus may be configured to execute the corresponding steps in the method provided in the embodiments of this disclosure. As shown in FIG. 12, the multimedia data processing apparatus may include: a second acquisition module 121, a second matching module 122, and a decoding module 123.

The second acquisition module is configured to acquire attribute information of a to-be-decoded data block in a multimedia data frame. The second matching module is configured to acquire a second target reference data block matching the attribute information of the to-be-decoded data block, the second target reference data block being selected from a first reference data block set, a second reference data block set, or a third reference data block set integrating the first reference data block set and the second reference data block set, the first reference data block set including decoded data blocks not having a neighbor relationship with the to-be-decoded data block, and the second reference data block set including decoded data blocks having a neighbor relationship with the to-be-decoded data block. The decoding module is configured to decode the to-be-decoded data block according to the second target reference data block.

In some embodiments, the attribute information of the to-be-decoded data block includes a media type of the multimedia data frame to which the to-be-decoded data block belongs; and the second matching module is further configured to: acquire the second target reference data block matching the attribute information of the to-be-decoded data block from the first reference data block set, in response to the media type of the multimedia data frame being an intra-frame type; and acquire the second target reference data block matching the attribute information of the to-be-decoded data block from the first reference data block set or the third reference data block set, in response to the media type of the multimedia data frame being a non-intra-frame type.

In some embodiments, the attribute information of the to-be-decoded data block includes a reference flag of the multimedia data frame to which the to-be-decoded data block belongs; and the second matching module is further configured to: acquire the second target reference data block matching the attribute information of the to-be-decoded data block from the first reference data block set or the third reference data block set, in response to the reference flag of the multimedia data frame being a first reference flag; and acquire the second target reference data block matching the attribute information of the to-be-decoded data block from the second reference data block set, in response to the reference flag of the multimedia data frame being a second reference flag.

In some embodiments, the first reference data block set includes one or more first reference data blocks; in response to a decoding mode of the multimedia data frame being a serial decoding mode, the first reference data block is a decoded data block whose parameter association relationship in the multimedia data frame satisfies a write-back limitation condition and which belongs to the same decoding tile as the to-be-decoded data block; the parameter association relationship is used for reflecting an association relationship among first position information, size information of a superblock (or largest decoding block) and second position information, the first position information and the second position information being position information of a decoded data block and of the to-be-decoded data block in the multimedia data frame respectively; and the write-back limitation condition being used for reflecting a delay limitation or requirement for writing the decoded data block to the first reference data block set;

In some embodiments, the first reference data block set includes one or more second reference data blocks; the second reference data block is a decoded data block which belongs to the same decoding tile as the to-be-decoded data block and whose parameter association relationship in the multimedia data frame satisfies a write-back limitation condition and a decoding processing condition; the parameter association relationship is used for reflecting an association relationship among respective position information of a decoded data block and of the to-be-decoded data block in the multimedia data frame and size information of the superblock (or largest decoding block); and the write-back limitation condition being used for reflecting a delay limitation or requirement for writing the decoded data block to the first reference data block set;

In some embodiments, the second reference data block set includes one or more third reference data blocks, the third reference data blocks being decoded data blocks in the multimedia data frame that are located in the same decoding processing unit as the to-be-decoded data block; or the second reference data block set comprises one or more fourth reference data blocks, the fourth reference data blocks being decoded data blocks in the multimedia data frame that have a neighbor relationship with the to-be-decoded data block and belong to the same decoding tile as the to-be-decoded data block.

In some embodiments, a plurality of to-be-decoded data blocks exist in the multimedia data frame, and the second acquisition module is further configured to: acquire attribute information of each of the to-be-decoded data blocks in the multimedia data frame; in response to determining according to the attribute information of the to-be-decoded data blocks in the multimedia data frame that the second target reference data blocks corresponding to all the to-be-decoded data blocks in the multimedia data frame belong to the second reference data block set, perform filtering processing on the to-be-decoded data blocks in the multimedia data frame; in response to determining according to the attribute information of the to-be-decoded data blocks in the multimedia data frame that the second target reference data block corresponding to one of the to-be-decoded data blocks in the multimedia data frame belongs to the first reference data block set, stop filtering processing on the to-be-decoded data blocks in the multimedia data frame; and in response to determining according to the attribute information of the to-be-decoded data blocks in the multimedia data frame that a first area of the second target reference data block corresponding to one of the to-be-decoded data blocks in the multimedia data frame belongs to the first reference data block set and a second area of the second target reference data block belongs to the second reference data block set, stop filtering processing on the to-be-decoded data blocks in the multimedia data frame.

According to one embodiment of this disclosure, the steps involved in the multimedia data processing method shown in FIG. 10 may be performed by the modules in the multimedia data processing apparatus shown in FIG. 12. For example, step S201 shown in FIG. 10 may be performed by the second acquisition module 121 in FIG. 12, step S202 shown in FIG. 10 may be performed by the second matching module 122 in FIG. 12, and step S203 shown in FIG. 10 may be performed by the decoding module 123 in FIG. 12.

According to one embodiment of this disclosure, the modules in the multimedia data processing apparatus shown in FIG. 11 and FIG. 12 may be separately or wholly combined into one or several other units, or one (or more) of the units may further be divided into at least two smaller subunits by functions, as long as the same operations can be implemented and the technical effects of the embodiments of this disclosure can be achieved. The foregoing modules are divided based on logical functions. In an actual application, a function of one module may be implemented by at least two units, or functions of at least two units are implemented by one unit. In some other embodiments of this disclosure, the data processing apparatus may also include other units. In an actual application, these functions may also be cooperatively implemented by others unit, and may be cooperatively implemented by at least two units.

According to one embodiment of this disclosure, a computer program (including program code) that can perform the steps involved in the corresponding methods shown in FIG. 7 and FIG. 10 may be run on a generic computing device, such as a computer, including processing elements and memory elements such as a central processing unit (CPU), a random access memory (RAM), a read-only memory (ROM), and so on, to construct the multimedia data processing apparatus shown in FIG. 11 and FIG. 12, and to implement the multimedia data processing method in the embodiments of this disclosure. The computer program may be recorded in, for example, a computer-readable storage medium, and may be loaded into the computing device through the computer-readable storage medium and run in the computing device.

Figure 13:
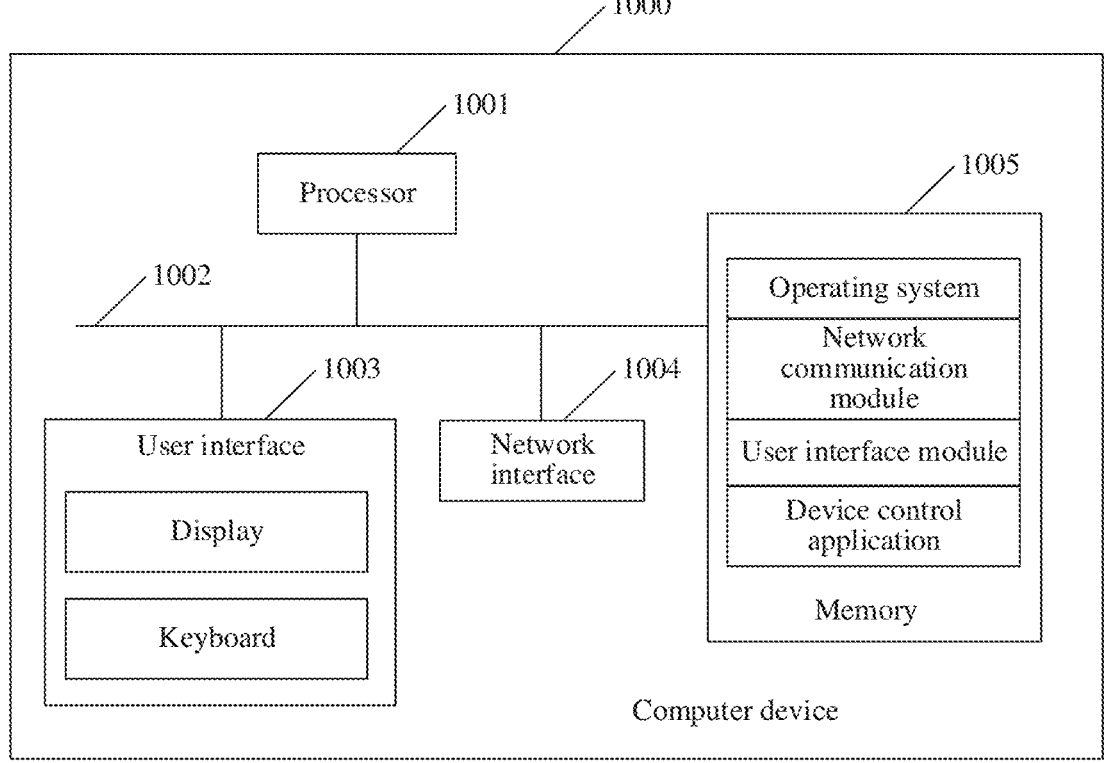
FIG. 13 is a schematic structural diagram of a computer device according to an embodiment of this disclosure.

FIG. 13 is a schematic structural diagram of a computer device according to an embodiment of this disclosure. As shown in FIG. 13, the computer device 1000 may include: a processor 1001, a network interface 1004, and a memory 1005. In addition, the computer device 1000 may further include: a media content interface 1003 and at least one communication bus 1002. The communication bus 1002 is configured to implement connection and communication between these components. The media content interface 1003 may include a display and a keyboard. Optionally, the media content interface 1003 may further include a standard wired interface and a standard wireless interface. Optionally, the network interface 1004 may include a standard wired interface and a standard wireless interface (for example, a Wi-Fi interface). The memory 1005 may be a high-speed random access memory (RAM), or may be a non-volatile memory, for example, at least one magnetic disk storage. Optionally, the memory 1005 may alternatively be at least one storage apparatus located remotely from the processor 1001. As shown in FIG. 13, the memory 1005 used as a computer-readable storage medium may include an operating system, a network communication module, a media content interface module, and a device control application. In the computer device 1000 shown in FIG. 13, the network interface 1004 may provide a network communication function, the media content interface 1003 is mainly configured to provide an input interface for media contents.

It should be understood that the computer device 1000 described in the embodiments of this disclosure may execute the description of the multimedia data processing method in the foregoing embodiments corresponding to FIG. 7 and FIG. 10, and may also execute the description of the multimedia data processing apparatus in the foregoing embodiment corresponding to FIG. 11 and FIG. 12, and the details will not be repeated here. In addition, beneficial effects achieved by using the same method are not described herein again.

In addition, it is to be noted that: an embodiment of this disclosure further provides a computer-readable storage medium, such as a non-transitory computer-readable storage medium. The computer-readable storage medium stores a computer program executed by the multimedia data processing apparatus mentioned above, and the computer program includes program instructions. When executing the program instructions, the processor can implement the descriptions of the multimedia data processing method in the foregoing embodiment corresponding to FIG. 7 and FIG. 10. Therefore, the details will not be repeated here. In addition, beneficial effects achieved by using the same method are not described herein again. For technical details that are not disclosed in the embodiment of the computer-readable storage medium of this application, refer to the descriptions of the method embodiments of this disclosure.

By way of example, the program instructions may be deployed on one computer device, or executed on at least two computer devices located in one location, or executed on at least two computer devices distributed in at least two locations and interconnected by a communication network. The at least two computer devices distributed in the at least two locations and interconnected by the communication network can form a blockchain network.

The computer-readable storage medium may be the multimedia data processing apparatus provided in any one of the foregoing embodiments or an internal storage unit of the computer device described above, for example, a hard disk or an internal memory of the computer device. The computer-readable storage medium may alternatively be an external storage device of the computer device, for example, a removable hard disk, a smart media card (SMC), a secure digital (SD) card, or a flash card equipped on the computer. Further, the computer-readable storage medium may include both an internal storage unit and an external storage device of the computer device. The computer-readable storage medium is configured to store the computer program and other program and data that are required by the computer device. The computer-readable storage medium may further be configured to temporarily store data that has been output or data to be output.

An embodiment of this disclosure further provides a computer program product, including a computer program or computer instructions. The computer program or computer instructions, when executed by a processor, implement the descriptions of the multimedia data processing method in the foregoing embodiment corresponding to FIG. 7 and FIG. 10. Therefore, the details will not be repeated here. In addition, beneficial effects achieved by using the same method are not described herein again. For technical details that are not disclosed in the embodiment of the computer program product of this application, refer to the descriptions of the method embodiments of this disclosure.

In the specification, claims, and accompanying drawings of the embodiments of this disclosure, the terms "first", "second" or the like are intended to distinguish between different media contents but do not indicate a particular order. In addition, the terms "include" and any variant thereof are intended to cover a non-exclusive inclusion. For example, a process, method, apparatus, product, or device that includes a series of operations or modules is not limited to the listed operations or modules; and instead, further optionally includes an operation or module that is not listed, or further optionally includes another operation or module that is intrinsic to the process, method, apparatus, product, or device.

A person of ordinary skill in the art may be aware that the units and operations in the examples described with reference to the embodiments disclosed herein may be implemented by electronic hardware, computer software, or a combination thereof. To clearly describe the interchangeability between the hardware and the software, the foregoing has generally described compositions and operations of each example according to functions. Whether the functions are executed in a mode of hardware or software depends on particular applications and design constraint conditions of the technical solutions. A person skilled in the art may use different methods to implement the described functions for each particular application, but it is not to be considered that the implementation goes beyond the scope of this application.

The methods and related apparatuses provided in the embodiments of this disclosure are described with reference to the method flowcharts and/or schematic structural diagrams provided in the embodiments of this disclosure. Specifically, each process and/or block of the method flowcharts and/or schematic structural diagrams, and combination of processes and/or blocks in the flowcharts and/or block diagrams, may be implemented by program instructions. These computer program instructions may be provided to a general-purpose computer, a dedicated computer, an embedded processor, or a processor of another programmable data processing apparatus to generate a machine, so that the instructions executed by the computer or the processor of the another programmable data processing apparatus generate an apparatus for implementing a specific function in one or more processes in the flowcharts and/or in one or more blocks in the schematic structural diagrams. These computer program instructions may also be stored in a computer-readable memory that can guide a computer or another programmable data processing device to work in a specified manner, so that the instructions stored in the computer-readable memory generate a product including an instruction apparatus, where the instruction apparatus implements functions specified in one or more procedures in the flowcharts and/or one or more blocks in the schematic structural diagrams. The computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the schematic structural diagrams.

The foregoing disclosure is merely exemplary embodiments of this disclosure, and certainly is not intended to limit the protection scope of this application. Therefore, equivalent variations made in accordance with the claims of this application fall within the scope of this application.

The invention claimed is:

1. A multimedia data processing method, comprising:
acquiring attribute information of a to-be-decoded data block in a multimedia data frame;
acquiring a first target reference data block matching the attribute information of the to-be-decoded data block from one of: a first reference data block set, a second reference data block set, or a third reference data block set integrating the first reference data block set and the second reference data block set, the first reference data block set comprising decoded data blocks not having a neighbor relationship with the to-be-decoded data block, and the second reference data block set comprising decoded data blocks having a neighbor relationship with the to-be-decoded data block, wherein:
the first reference data block set comprises one or more first reference data blocks;
the first reference data block is an encoded data block satisfying the following three conditions: the first reference data block belongs to the same decoding tile as the to-be-decoded data block, a parameter association relationship in the multimedia data frame satisfies a write-back limitation condition, and the parameter association relationship satisfies a decoding processing condition;
the parameter association relationship indicates an association relationship among first position information, size information of a superblock and second position information, the first position information being position information of an encoded data block in the multimedia data frame, and the second position information being position information of the to-be-decoded data block in the multimedia data frame; and
the write-back limitation condition indicates a delay requirement for writing the decoded data block to the first reference data block set; and
decoding the to-be-decoded data block according to the first target reference data block.

2. The method according to claim 1, wherein:
the attribute information of the to-be-decoded data block comprises a media type of the multimedia data frame to which the to-be-decoded data block belongs; and
acquiring the first target reference data block matching the attribute information of the to-be-decoded data block comprises:
determining the first target reference data block matching the attribute information of the to-be-decoded data block from the first reference data block set or the third reference data block set, in response to the media type of the multimedia data frame being an intra-frame type; and
determining the first target reference data block matching the attribute information of the to-be-decoded data block from the second reference data block set, in response to the media type of the multimedia data frame being a non-intra-frame type.

3. The method according to claim 1, wherein:
the attribute information of the to-be-decoded data block comprises a reference flag of the multimedia data frame to which the to-be-decoded data block belongs; and
acquiring the first target reference data block matching the attribute information of the to-be-decoded data block comprises:
determining the first target reference data block matching the attribute information of the to-be-decoded data block from the first reference data block set or the third reference data block set, in response to the reference flag of the multimedia data frame being a first reference flag; and
determining the first target reference data block matching the attribute information of the to-be-decoded data block from the second reference data block set, in response to the reference flag of the multimedia data frame being a second reference flag, the first reference flag being used for indicating that a selection range of a reference data block of the to-be-decoded data block is the first reference data block set or the third reference data block set, and the second reference flag being used for indicating that the selection range of the reference data block of the to-be-decoded data block is the second reference data block set.

4. The method according to claim 1, wherein:
the first reference data block set comprises one or more second reference data blocks;
in response to a decoding mode of the multimedia data frame being a serial decoding mode, the second reference data block is an encoded data block satisfying the following two conditions: a parameter association relationship in the multimedia data frame satisfies a write-back limitation condition and the second reference data block belongs to the same decoding tile as the to-be-decoded data block;
the parameter association relationship indicates an association relationship among the first position information, size information of a largest decoding block and second position information, the first position information being position information of an encoded data block in the multimedia data frame, and the second position information being position information of the to-be-decoded data block in the multimedia data frame; and
the write-back limitation condition indicates a delay requirement for writing the decoded data block to the first reference data block set.

5. The method according to claim 1, wherein the second reference data block set comprises one or more third reference data blocks the third reference data blocks being decoded data blocks in the multimedia data frame that are located in the same decoding processing unit as the to-be-decoded data block.

6. The method according to claim 1, wherein the second reference data block set comprises one or more fourth reference data blocks, the fourth reference data blocks being decoded data blocks in the multimedia data frame that have a neighbor relationship with the to-be-decoded data block and belonging to the same decoding tile as the to-be-decoded data block.

7. The method according to claim 6, wherein when the fourth reference data blocks have the neighbor relationship with the to-be-decoded data block, the fourth reference data blocks and the to-be-decoded data block belong to the same superblock.

8. The method according to claim 6, wherein when the fourth reference data blocks have the neighbor relationship with the to-be-decoded data block, the fourth reference data blocks are located in N superblocks adjacent to the to-be-decoded data block, and a size of the superblock is less than or equal to a size threshold, N being determined according to size information of the superblock.

9. The method according to claim 6, wherein when the fourth reference data blocks have the neighbor relationship with the to-be-decoded data block, the fourth reference data blocks are located in N superblocks adjacent to the to-be-decoded data block, and a size of the superblock is greater than or equal to a size threshold; in the multimedia data frame, in response to moving the fourth reference data block along a first direction by one superblock, a data block located at an uppermost corner in a second direction in an area where the moved fourth reference data block is located is an unreconstructed data block, the first direction and the second direction being two opposite directions; and position information of the fourth reference data block after being moved by one superblock is different from the position information of the to-be-decoded data block.

10. The method according to claim 1, wherein:
  a distance between each of the first target reference data blocks and the to-be-decoded data block is less than a second distance threshold; and
  the each of the first target reference data block is located at an integer pixel position of the multimedia data frame.

11. The method according to claim 1, wherein a plurality of to-be-decoded data blocks exist in the multimedia data frame, and the method further comprises:
  acquiring attribute information of each of the to-be-decoded data blocks in the multimedia data frame;
  in response to determining according to the attribute information of the to-be-decoded data blocks in the multimedia data frame that the first target reference data blocks corresponding to all the to-be-decoded data blocks in the multimedia data frame belong to the second reference data block set, performing filtering processing on the to-be-decoded data blocks in the multimedia data frame;
  in response to determining according to the attribute information of the to-be-decoded data blocks in the multimedia data frame that the first target reference data block corresponding to one of the to-be-decoded data blocks in the multimedia data frame belongs to the first reference data block set, stopping filtering processing on the to-be-decoded data blocks in the multimedia data frame; and in response to determining according to the attribute information of the to-be-decoded data blocks in the multimedia data frame that a first area of the first target reference data block corresponding to one of the to-be-decoded data blocks in the multimedia data frame belongs to the first reference data block set and a second area of the first target reference data block belongs to the second reference data block set, stopping filtering processing on the to-be-decoded data blocks in the multimedia data frame.

12. A device comprising a memory for storing computer instructions and a processor in communication with the memory, wherein, when the processor executes the computer instructions, the processor is configured to cause the device to:
  acquire attribute information of a to-be-decoded data block in a multimedia data frame;
  acquire a first target reference data block matching the attribute information of the to-be-decoded data block from one of: a first reference data block set, a second reference data block set, or a third reference data block set integrating the first reference data block set and the second reference data block set, the first reference data block set comprising decoded data blocks not having a neighbor relationship with the to-be-decoded data block, and the second reference data block set comprising decoded data blocks having a neighbor relationship with the to-be-decoded data block, wherein:
  the first reference data block set comprises one or more first reference data blocks;
  the first reference data block is an encoded data block satisfying the following three conditions: the first reference data block belongs to the same decoding tile as the to-be-decoded data block, a parameter association relationship in the multimedia data frame satisfies a write-back limitation condition, and the parameter association relationship satisfies a decoding processing condition;
  the parameter association relationship indicates an association relationship among first position information, size information of a superblock and second position information, the first position information being position information of an encoded data block in the multimedia data frame, and the second position information being position information of the to-be-decoded data block in the multimedia data frame; and
  the write-back limitation condition indicates a delay requirement for writing the decoded data block to the first reference data block set; and
  decode the to-be-decoded data block according to the first target reference data block.

13. The device according to claim 12, wherein:
  the attribute information of the to-be-decoded data block comprises a media type of the multimedia data frame to which the to-be-decoded data block belongs; and
  wherein, when the processor is configured to cause the device to acquire the first target reference data block matching the attribute information of the to-be-decoded data block, the processor is configured to cause the device to:
  determine the first target reference data block matching the attribute information of the to-be-decoded data block from the first reference data block set or the third reference data block set, in response to the media type of the multimedia data frame being an intra-frame type; and determine the first target reference data block matching the attribute information of the to-be-decoded data block from the second reference data block set, in response to the media type of the multimedia data frame being a non-intra-frame type.

14. The device according to claim 12, wherein:

the attribute information of the to-be-decoded data block comprises a reference flag of the multimedia data frame to which the to-be-decoded data block belongs; and wherein, when the processor is configured to cause the device to acquire the first target reference data block matching the attribute information of the to-be-decoded data block, the processor is configured to cause the device to:

determine the first target reference data block matching the attribute information of the to-be-decoded data block from the first reference data block set or the third reference data block set, in response to the reference flag of the multimedia data frame being a first reference flag; and determine the first target reference data block matching the attribute information of the to-be-decoded data block from the second reference data block set, in response to the reference flag of the multimedia data frame being a second reference flag, the first reference flag being used for indicating that a selection range of a reference data block of the to-be-decoded data block is the first reference data block set or the third reference data block set, and the second reference flag being used for indicating that the selection range of the reference data block of the to-be-decoded data block is the second reference data block set.

15. The device according to claim 12, wherein:

the first reference data block set comprises one or more second reference data blocks;

in response to a decoding mode of the multimedia data frame being a serial decoding mode, the second reference data block is an encoded data block satisfying the following two conditions: a parameter association relationship in the multimedia data frame satisfies a write-back limitation condition and the second reference data block belongs to the same decoding tile as the to-be-decoded data block;

the parameter association relationship indicates an association relationship among the first position information, size information of a largest decoding block and second position information, the first position information being position information of an encoded data block in the multimedia data frame, and the second position information being position information of the to-be-decoded data block in the multimedia data frame; and the write-back limitation condition indicates a delay requirement for writing the decoded data block to the first reference data block set.

16. A non-transitory storage medium for storing computer readable instructions, the computer readable instructions, when executed by a processor, causing the processor to:

acquire attribute information of a to-be-decoded data block in a multimedia data frame;

acquire a first target reference data block matching the attribute information of the to-be-decoded data block from one of: a first reference data block set, a second reference data block set, or a third reference data block set integrating the first reference data block set and the second reference data block set, the first reference data block set comprising decoded data blocks not having a neighbor relationship with the to-be-decoded data block, and the second reference data block set comprising decoded data blocks having a neighbor relationship with the to-be-decoded data block, wherein:

the first reference data block set comprises one or more first reference data blocks;

the first reference data block is an encoded data block satisfying the following three conditions: the first reference data block belongs to the same decoding tile as the to-be-decoded data block, a parameter association relationship in the multimedia data frame satisfies a write-back limitation condition, and the parameter association relationship satisfies a decoding processing condition;

the parameter association relationship indicates an association relationship among first position information, size information of a superblock and second position information, the first position information being position information of an encoded data block in the multimedia data frame, and the second position information being position information of the to-be-decoded data block in the multimedia data frame; and the write-back limitation condition indicates a delay requirement for writing the decoded data block to the first reference data block set; and decode the to-be-decoded data block according to the first target reference data block.

17. The non-transitory storage medium according to claim 16, wherein:

the attribute information of the to-be-decoded data block comprises a media type of the multimedia data frame to which the to-be-decoded data block belongs; and wherein, when the computer readable instructions cause the processor to acquire the first target reference data block matching the attribute information of the to-be-decoded data block, the computer readable instructions cause the processor to:

determine the first target reference data block matching the attribute information of the to-be-decoded data block from the first reference data block set or the third reference data block set, in response to the media type of the multimedia data frame being an intra-frame type; and determine the first target reference data block matching the attribute information of the to-be-decoded data block from the second reference data block set, in response to the media type of the multimedia data frame being a non-intra-frame type.

18. The non-transitory storage medium according to claim 16, wherein:

the attribute information of the to-be-decoded data block comprises a reference flag of the multimedia data frame to which the to-be-decoded data block belongs; and wherein, when the computer readable instructions cause the processor to acquire the first target reference data block matching the attribute information of the to-be-decoded data block, the computer readable instructions cause the processor to:

determine the first target reference data block matching the attribute information of the to-be-decoded data block from the first reference data block set or the third reference data block set, in response to the reference flag of the multimedia data frame being a first reference flag; and determine the first target reference data block matching the attribute information of the to-be-decoded data block from the second reference data block set, in response to the reference flag of the multimedia data frame being a second reference flag, the first reference flag being used for indicating that a selection range of a reference data block of the to-be-decoded data block is the first reference data block set or the third reference data block set, and the second reference flag being used for indicating that the selection range of the reference data block of the to-be-decoded data block is the second reference data block set.

19. The non-transitory storage medium according to claim 16, wherein:

the first reference data block set comprises one or more second reference data blocks;

in response to a decoding mode of the multimedia data frame being a serial decoding mode, the second reference data block is an encoded data block satisfying the following two conditions: a parameter association relationship in the multimedia data frame satisfies a write-back limitation condition and the second reference data block belongs to the same decoding tile as the to-be-decoded data block;

the parameter association relationship indicates an association relationship among the first position information, size information of a largest decoding block and second position information, the first position information being position information of an encoded data block in the multimedia data frame, and the second position information being position information of the to-be-decoded data block in the multimedia data frame; and the write-back limitation condition indicates a delay requirement for writing the decoded data block to the first reference data block set.

* * * * *